(12) United States Patent
Tsukagoshi

(10) Patent No.: US 12,008,999 B2
(45) Date of Patent: *Jun. 11, 2024

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,353

(22) Filed: Mar. 22, 2023

(65) Prior Publication Data

US 2023/0230601 A1 Jul. 20, 2023

Related U.S. Application Data

(63) Continuation of application No. 17/203,588, filed on Mar. 16, 2021, now Pat. No. 11,636,862, which is a
(Continued)

(30) Foreign Application Priority Data

Apr. 24, 2015 (JP) ................. 2015-089863

(51) Int. Cl.
*G10L 19/008* (2013.01)
*G10L 19/00* (2013.01)
(Continued)

(52) U.S. Cl.
CPC ............ *G10L 19/008* (2013.01); *G10L 19/00* (2013.01); *G10L 19/167* (2013.01);
(Continued)

(58) Field of Classification Search
None
See application file for complete search history.

(56) References Cited

U.S. PATENT DOCUMENTS

2002/0035725 A1 3/2002 Ando
2007/0130187 A1 6/2007 Burgan et al.
(Continued)

FOREIGN PATENT DOCUMENTS

CN 101473645 A 7/2009
CN 101896964 A 11/2010
(Continued)

OTHER PUBLICATIONS

International Search Report dated Jun. 21, 2016, in PCT/JP2016/061488 filed Apr. 8, 2016.
(Continued)

*Primary Examiner* — Qin Zhu
(74) *Attorney, Agent, or Firm* — Oblon, McClelland, Maier & Neustadt, L.L.P.

(57) ABSTRACT

A processing load at a receiving side is reduced in a case where a plurality of classes of audio data is transmitted. A predetermined number of audio streams including coded data of a plurality of groups is generated and a container of a predetermined format having this predetermined number of audio streams is transmitted. Command information for creating a command specifying a group to be decoded from among the plurality of groups is inserted into the container and/or the audio stream. For example, a command insertion area for the receiving side to insert a command for specifying a group to be decoded is provided in at least one audio stream among the predetermined number of audio streams.

11 Claims, 25 Drawing Sheets

Related U.S. Application Data continuation of application No. 16/390,909, filed on Apr. 22, 2019, now Pat. No. 10,978,080, which is a continuation of application No. 15/564,548, filed as application No. PCT/JP2016/061488 on Apr. 8, 2016, now Pat. No. 10,304,467.

(51) Int. Cl.

| | | |
|---|---|---|
| *G10L 19/16* | (2013.01) | |
| *H04N 21/233* | (2011.01) | |
| *H04N 21/431* | (2011.01) | |
| *H04N 21/434* | (2011.01) | |
| *H04N 21/439* | (2011.01) | |
| *H04N 21/6332* | (2011.01) | |
| *H04N 21/81* | (2011.01) | |
| *H04N 21/854* | (2011.01) | |
| *H04S 3/00* | (2006.01) | |
| *H04S 5/02* | (2006.01) | |

(52) U.S. Cl.
CPC ......... *H04N 21/233* (2013.01); *H04N 21/431* (2013.01); *H04N 21/4343* (2013.01); *H04N 21/439* (2013.01); *H04N 21/8106* (2013.01); *H04N 21/85406* (2013.01); *H04S 5/02* (2013.01); *H04N 21/6332* (2013.01); *H04S 3/008* (2013.01); *H04S 2400/01* (2013.01)

(56) References Cited

U.S. PATENT DOCUMENTS

| | | |
|---|---|---|
| 2007/0219808 A1 | 9/2007 | Herre et al. |
| 2008/0215777 A1 | 9/2008 | Richenstein et al. |
| 2009/0147961 A1 | 6/2009 | Lee et al. |
| 2009/0245398 A1 | 10/2009 | Oh et al. |
| 2010/0046758 A1* | 2/2010 | Pang ................. G10L 19/24 |
| | | 381/17 |
| 2010/0112974 A1 | 5/2010 | Sahai et al. |
| 2011/0063499 A1 | 3/2011 | Tanaka |
| 2011/0311058 A1 | 12/2011 | Oh et al. |
| 2012/0128151 A1 | 5/2012 | Boehm et al. |
| 2012/0259642 A1 | 10/2012 | Takada |
| 2014/0126651 A1 | 5/2014 | Erickson |
| 2016/0029138 A1 | 1/2016 | France et al. |
| 2016/0330491 A1 | 11/2016 | Yamagishi |
| 2016/0381399 A1 | 12/2016 | Brondijk |

FOREIGN PATENT DOCUMENTS

| | | |
|---|---|---|
| CN | 102959622 A | 3/2013 |
| CN | 203415228 U | 1/2014 |
| CN | 103650539 A | 3/2014 |
| CN | 104505096 A | 4/2015 |
| CN | 106664503 A | 5/2017 |
| JP | 2008-511848 A | 4/2008 |
| JP | 2014-013400 | 1/2014 |
| JP | 2014-520491 A | 8/2014 |
| JP | 2014-222853 A | 11/2014 |
| WO | WO-2007136187 A1 | 11/2007 |
| WO | WO-2015017235 A1 | 2/2015 |

OTHER PUBLICATIONS

Japanese Office Action Issued in Japanese Patent Application No. 2017-514064 dated Jun. 2, 2020 (5 pages).
Robert Brondijk, et al., "MPEG-H 3D Audio Single-Stream System Operation," International Organization for Standardisation, ISO/IEC JTC1/SC29/WG11 MPEG2014/M35025, Oct. 2014, 5 pages.

* cited by examiner

FIG. 6

| groupID | attribute | switchGroupID | presetGroupID [1] | presetGroupID [2] | StreamID | Kind |
|---|---|---|---|---|---|---|
| 1 | Channel data | 0 | 1 | 1 | 1 | |
| 2 | Object for Immersive sound | 0 | 2 | 2 | 1 | |
| 3 | Object for speech language 1 | 1 | 3 | 3 | 2 | |
| 4 | Object for sound type 1 | 2 | 4 | | 2 | |
| 5 | Object for sound type 2 | 2 | 5 | | 2 | |
| 6 | Object for speech language 2 | 1 | 6 | 6 | 3 | |
| 7 | Object for audio description 1 | 3 | | 7 | 3 | |
| 8 | Object for audio description 2 | 3 | | 8 | 3 | |

FIG. 9

| groupID | attribute | switchGroupID | presetGroupID [1] | [2] | [3] | [4] | StreamID | Kind |
|---|---|---|---|---|---|---|---|---|
| 1 | Channel data | 0 | 1 | 1 | | | 1 | |
| 2 | Object for Immersive sound | 0 | 2 | 2 | | | 1 | |
| 3 | Object for speech language 1 | 1 | 3 | | | | 2 | |
| 4 | Object for sound type 1 | 2 | | | 4 | | 2 | |
| 5 | Object for sound type 2 | 2 | | | 5 | | 2 | |
| 6 | Object for speech language 2 | 1 | | 6 | | | 3 | |
| 7 | Object for audio description 1 | 3 | | | | 7 | 3 | |
| 8 | Object for audio description 2 | 3 | | | | 8 | 3 | |

FIG. 13

3Daudio_stream_config_descriptor

| Syntax | No. of Bits | Format |
|---|---|---|
| 3Daudio_stream_config_descriptor(){ | | |
|   descriptor_tag | 8 | uimsbf |
|   descriptor_length | 8 | uimsbf |
|   NumOfGroups, N | 8 | uimsbf |
|   NumOfPresetGroups, P | 8 | uimsbf |
|   NumOfCommand; Q | 8 | |
|   for (i = 0 ; i < N ; i++){ | | |
|     groupID | 8 | uimsbf |
|     attribute_of_groupID | 8 | uimsbf |
|     SwitchGroupID | 8 | uimsbf |
|     audio_streamID | 8 | uimsbf |
|     content_kind | | |
|   } | | |
|   for (j = 0 ; j < P ; j++){ | | |
|     presetGroupID | 8 | uimsbf |
|     NumOfGroups_in_preset, R | 8 | uimsbf |
|     for (k = 0 ; k < R ; k++){ | | |
|       groupID | 8 | uimsbf |
|     } | | |
|   } | | |
| // CONTINUED TO NEXT PAGE | | |

FIG. 14

3Daudio_stream_config_descriptor

| Syntax | No. of Bits | Format |
|---|---|---|
| //CONTINUED FROM PREVIOUS PAGE | | |
| for ( k = 0 ; k < Q ; k++ ){ | | |
|   commandID | 8 | uimsbf |
|   selection_type | 1 | bslbf |
|   reserved | 7 | 0x7f |
|   if( !selection_type ) { // SELECTION BETWEEN presetGroup OR Group | | |
|     Max_NumOfPresetGroups_in_command; W | 8 | uimsbf |
|     for( j = 0; j< W; j++ ){ | | |
|       presetGroupID | 8 | uimsbf |
|     } | | |
|   } else { | | |
|     Max_NumOfGroups_in_command; S | 8 | uimsbf |
|     for( i = 0; i < S ; i++) { | | |
|       groupID | 8 | uimsbf |
|     } | | |
|   } | | |
| } | | |
| } | | |

FIG. 15

Semantics of 3Daudio_stream_config_descriptor

NumOfGroups (8bits)
    REPRESENTS NUMBER OF Groups (VALUE EQUAL TO OR LARGER THAN ONE).
NumOfPresetGroups (8bits)
    REPRESENTS NUMBER OF PresetGroups (VALUE EQUAL TO OR LARGER THAN ONE).
NumOfCommands (8bits)
    REPRESENTS NUMBER OF COMMANDS (VALUE EQUAL TO OR LARGER THAN ONE).
groupID (8bits)
    REPRESENTS IDENTIFIER OF group (VALUE OTHER THAN ZERO).
attribute_of_groupID (8bits)
    REPRESENTS ATTRIBUTE OF CODED DATA OF CORRESPONDING group (VALUE OTHER THAN ZERO).
switchGroupID (8bits)
    IDENTIFIER INDICATING WHICH switchGroup CORRESPONDING group BELONGS TO.
    '0'    CORRESPONDING group BELONGS TO NO switchGroup.
    VALUE OTHER THAN '0'  REPRESENTS switchGroup CORRESPONDING group BELONGS TO.
audio_streamID (8bits)
    IDENTIFIER OF AUDIO STREAM.
Content_Kind (8bits)
    REPRESENTS CLASS OF CONTENT OF group.
presetGroupID (8bits)
    IDENTIFIER INDICATING BUNDLE IN WHICH Group IS PRESET.
NumOfGroups_in_preset (8bits)
    REPRESENTS NUMBER OF Groups BELONGING TO presetGroup.

commandID (8bits)
    STANDS FOR COMMAND IDENTIFIER AND REPRESENTS DECODING TARGET.
selection_type (1bit)
    REPRESENTS TYPE OF COMMAND DESIGNATION.
    '1'    DESIGNATES group.
    '0'    DESIGNATES presetGroup.
Max_NumOfPresetGroups_in_command (8bits)
    REPRESENTS NUMBER OF PresetGroups INCLUDED IN ONE COMMAND.
    RELATIONSHIP OF Max_NumOfPresetGroups_in_command <= NumOfTubePresetGroup IS ESTABLISHED.
    IN ADDITION, NumOfTubepresetGroups REPRESENTS NUMBER OF tubes (BUNDLES) OF PresetGroups.
Max_NumOfGroups_in_command (8bits)
    REPRESENTS NUMBER OF Groups INCLUDED IN ONE COMMAND.

FIG. 16

3Daudio_streamID_descriptor

| Syntax | No. of Bits | Format |
|---|---|---|
| 3Daudio_streamID_descriptor(){ | | |
| descriptor_tag | 8 | uimsbf |
| descriptor_length | 8 | uimsbf |
| audio_streamID | 8 | uimsbf |
| } | | |

(a)

audio_streamID (8bits)
IDENTIFIER OF AUDIO STREAM.

3Daudio_command_descriptor (a)

| Syntax | No. of Bits | Format |
|---|---|---|
| 3Daudio_command_descriptor(){ | | |
|   descriptor_tag | 8 | uimsbf |
|   descriptor_length | 8 | uimsbf |
|   NumOfCommands, N | 8 | uimsbf |
|   for (i = 0 ; i < N ; i++){ | | |
|     commandID | 8 | uimsbf |
|   } | | |
| } | | |

Semantics of 3Daudio_command_descriptor (b)

NumOfCommands, N (8bits)   REPRESENTS NUMBER OF commands.
Command_ID (8bits)   REPRESENTS COMMAND IDENTIFIER.

FIG. 22
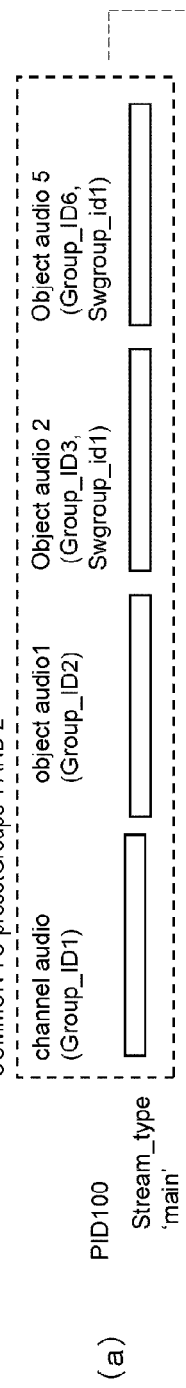
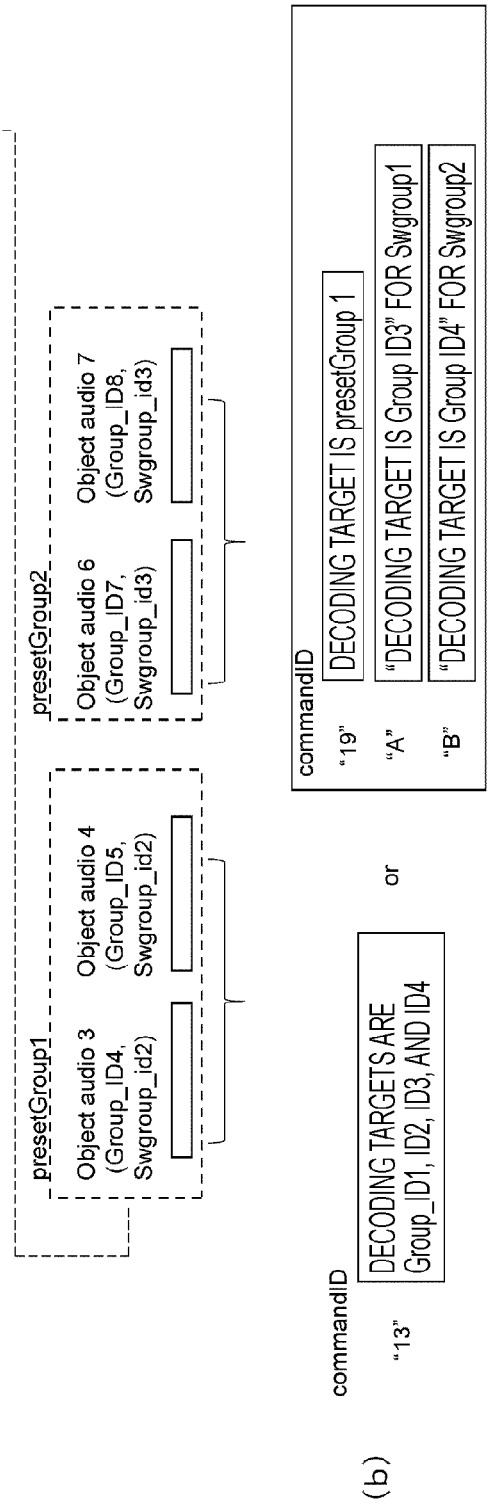
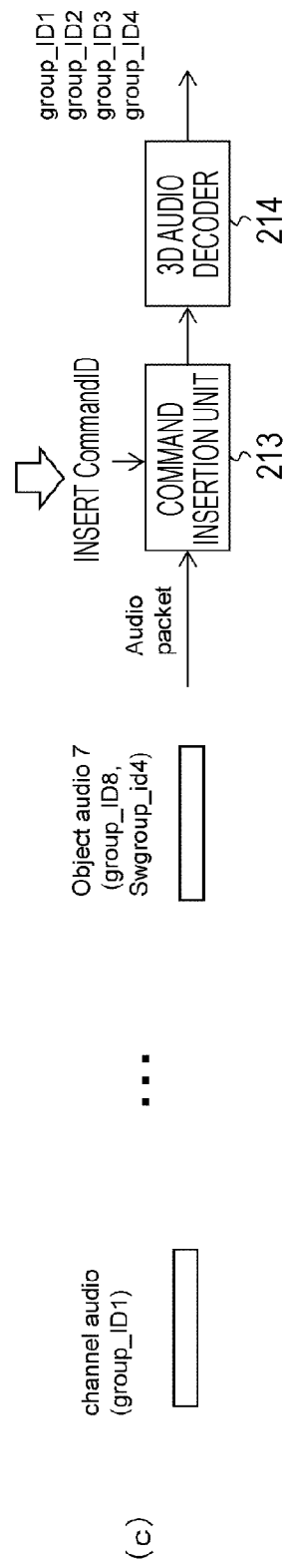

TRANSMISSION DEVICE, TRANSMISSION METHOD, RECEPTION DEVICE, AND RECEPTION METHOD

CROSS-REFERENCE TO RELATED APPLICATIONS

This application is a continuation of U.S. Ser. No. 17/203,588, filed Mar. 16, 2021, which is a continuation of U.S. Ser. No. 16/390,909, filed Apr. 22, 2019, now U.S. Pat. No. 10,978,080, issued on Apr. 13, 2021, which is a continuation of U.S. Ser. No. 15/564,548 filed Oct. 5, 2017 now U.S. Pat. No. 10,304,467 issued on May 28, 2019, the entire contents of which are incorporated herein by reference. U.S. Ser. No. 15/564,548 is a national stage of PCT/JP2016/061488 filed Apr. 8, 2016, and also claims priority under 35 U.S.C. 119 to Japanese Application No. 2015-089863 filed Apr. 24, 2015.

TECHNICAL FIELD

The present technology relates to a transmission device, a transmission method, a reception device, and a reception method and particularly to a transmission device and so on that transmit a plurality of classes of audio data.

BACKGROUND ART

Conventionally, as a stereoscopic (3D) acoustic technology, a technology has been proposed in which encoded sample data is mapped to a speaker present at an arbitrary position and rendered on the basis of metadata (for example, refer to Patent Document 1).

CITATION LIST

Patent Document

Patent Document 1: Japanese National Publication of International Patent Application No. 2014-520491

SUMMARY OF THE INVENTION

Problems to be Solved by the Invention

It is conceivable to transmit object coded data made up of encoded sample data and metadata together with channel coded data for 5.1 channels, 7.1 channels, and so on to enable acoustic playback with enhanced realistic feeling at a receiving side.

An object of the present technology is to reduce a processing load at a receiving side in a case where a plurality of classes of audio data is transmitted.

Solutions to Problems

A concept of the present technology is
a transmission device including:
an audio encoding unit configured to generate a predetermined number of audio streams including coded data of a plurality of groups;
a transmission unit configured to transmit a container of a predetermined format having the predetermined number of audio streams; and
an information insertion unit configured to insert, into the container and/or some of the audio streams, command information for creating a command specifying a group to be decoded from among the plurality of groups.

In the present technology, a predetermined number of, that is, one or a plurality of audio streams including coded data of the plurality of groups is generated by the audio encoding unit. The container of a predetermined format having the predetermined number of audio streams is transmitted by the transmission unit. For example, the container may be a transport stream (MPEG-2 TS) adopted in a digital broadcasting standard. Alternatively, for example, the container may be MP4 used for distribution in the Internet or the like, or a container of a format other than MP4.

The command information for creating a command specifying a group to be decoded from among the plurality of groups is inserted into the container and/or some of the audio streams by the information insertion unit. For example, the command information may be information indicating correspondence relationships of the command with the groups, or information indicating a correspondence relationship of the command with a preset group made up of a combination of the predetermined number of groups.

As described above, in the present technology, the command information for creating a command specifying a group to be decoded from among the plurality of groups is inserted into the container and/or some of the audio streams. Therefore, referring to this command information makes it easy for the receiving side to perform creation processing for the command specifying a group to be decoded.

Note that, in the present technology, for example, the predetermined number of audio streams may be made up of a main stream and a predetermined number of sub-streams, or only of the main stream, and the information insertion unit may insert the command information into the main stream and/or a container position corresponding to this main stream. By inserting the command information into the main stream or the like in this manner, the receiving side can easily acquire the command information.

In addition, in the present technology, for example, the audio encoding unit may provide a command insertion area for a receiving side to insert a command specifying a group to be decoded, in at least one audio stream among the plurality of audio streams. Since the command insertion area is provided in advance in this manner, processing of inserting a command into the audio stream becomes easy at the receiving side.

In addition, another concept of the present technology is
a transmission device including:
an audio encoding unit configured to generate a predetermined number of audio streams including coded data of a plurality of groups; and
a transmission unit configured to transmit a container of a predetermined format having the predetermined number of audio streams, in which
the audio encoding unit provides a command insertion area for a receiving side to insert a command for specifying a group to be decoded, in at least one audio stream among the predetermined number of audio streams.

In the present technology, a predetermined number of, that is, one or a plurality of audio streams including coded data of the plurality of groups is generated by the audio encoding unit. The container of a predetermined format having the predetermined number of audio streams is transmitted by the transmission unit. For example, the container may be a transport stream (MPEG-2 TS) adopted in a digital broadcasting standard. Alternatively, for example, the container may be MP4 used for distribution in the Internet or the like, or a container of a format other than MP4.

In the audio encoding unit, the command insertion area for the receiving side to insert a command for specifying a group to be decoded is provided in at least one audio stream among the predetermined number of audio streams. For example, the predetermined number of audio streams may be made up of a main stream and a predetermined number of sub-streams, or only of the main stream, and the audio encoding unit may provide the command insertion area in the main stream.

As described above, in the present technology, the command insertion area for the receiving side to insert a command for specifying a group to be decoded is provided in at least one audio stream among the predetermined number of audio streams. Therefore, in a case where a command is inserted into the audio stream at the receiving side, this command insertion area can be used and the command insertion processing becomes easy.

In addition, another concept of the present technology is a reception device including:

a reception unit configured to receive a container of a predetermined format having a predetermined number of audio streams including coded data of a plurality of groups;

a stream acquisition unit configured to fetch all audio streams including a group to be decoded from the predetermined number of audio streams and obtain one audio stream constructed by integrating all of the fetched audio streams;

a command creation unit configured to create a command for specifying the group to be decoded from among a predetermined number of groups included in the one audio stream;

a command insertion unit configured to insert the command created by the command creation unit into the one audio stream acquired by the stream acquisition unit; and an audio decoding unit configured to accept input of the one audio stream into which the command has been inserted and apply decoding processing to coded data of the group specified by the command from among the predetermined number of groups included in the one audio stream.

In the present technology, the container of a predetermined format having the predetermined number of audio streams including coded data of the plurality of groups is received by the reception unit. All the audio streams including the group to be decoded are fetched from the predetermined number of audio streams and one audio stream constructed by integrating all of these fetched audio streams is obtained by the stream acquisition unit. In this case, when the predetermined number of audio streams includes one audio stream, this audio stream is obtained as it is.

The command for specifying a group to be decoded from among the predetermined number of groups included in the one audio stream is created by the command creation unit. For example, the command creation unit may create a command according to a selection operation of a user on a user interface screen. As a result, the user can easily select a desired group as a group to be decoded.

The command created by the command creation unit is inserted by the command insertion unit into the one audio stream acquired by the stream acquisition unit. The decoding processing is applied by the audio decoding unit to coded data of the group specified by the command from among the predetermined number of groups included in the one audio stream.

As described above, in the present technology, the command for specifying a group to be decoded is inserted into the audio stream and sent to the audio decoding unit. Therefore, in the audio decoding unit, it is made possible to selectively decode only coded image data of the group to be decoded. Additionally, in this case, the audio decoding unit is caused to perform group selection processing, enabling efficient processing.

Note that, in the present technology, for example, command information for creating a command specifying a group to be decoded from among the plurality of groups may be inserted into some of the audio streams and/or the container received by the reception unit, and the command creation unit may create the command with reference to the command information. In this case, the command is created with reference to the command information and thus, creation processing for the command specifying a group to be decoded becomes easy.

In addition, in the present technology, for example, a command insertion area for inserting a command for specifying a group to be decoded may be provided in at least one audio stream among the predetermined number of audio streams received by the reception unit, the one audio stream acquired by the stream acquisition unit may have the command insertion area, and the command insertion unit may insert the command into the command insertion area of the one audio stream. In this case, a command is inserted into the command insertion area provided in advance and thus, processing of inserting a command becomes easy.

Effects of the Invention

According to the present technology, it is made possible to reduce a processing load at a receiving side in a case where a plurality of classes of audio data is transmitted. Note that the effects described in the present specification merely serve as examples and not construed to be limited. There may be an additional effect as well.

BRIEF DESCRIPTION OF DRAWINGS

FIG. 6 is a diagram illustrating correspondence relationships between the groups and streams, and so on in the case of transmission in three streams.

FIG. 9 is a diagram illustrating correspondence relationships between groups and streams, and so on in the case of transmission in three streams.

FIG. 13 is a diagram illustrating an example of the structure of a 3D audio stream configuration descriptor (1/2).

FIG. 14 is a diagram illustrating an example of the structure of the 3D audio stream configuration descriptor (2/2).

FIG. 15 is a diagram illustrating the contents of primary information in the example of the structure of the 3D audio stream configuration descriptor.

FIG. 16 is a diagram illustrating an example of the structure of a 3D audio stream ID descriptor and the contents of primary information in this example of the structure.

FIG. 17 is a diagram illustrating an example of the structure of a 3D audio command descriptor and the contents of primary information in this example of the structure.

FIG. 22 is a diagram for explaining an example of selection processing for a decoding target in a case where the received audio stream has one stream.

MODE FOR CARRYING OUT THE INVENTION

Modes for carrying out the invention (hereinafter, referred to as "embodiments") will be described below. Note that the description will be given in the following order.
1. Embodiments
2. Variations 1. Embodiments

[Configuration Example of Transmission/Reception System]

Figure 1:
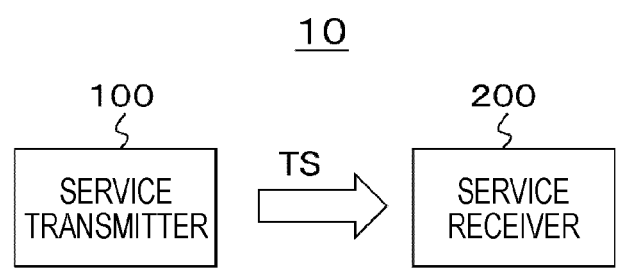
FIG. 1 is a block diagram illustrating a configuration example of a transmission/reception system serving as an embodiment.

FIG. 1 illustrates a configuration example of a transmission/reception system 10 serving as an embodiment. This transmission/reception system 10 is constituted by a service transmitter 100 and a service receiver 200. The service transmitter 100 incorporates a transport stream TS into a broadcasting wave or a packet in a network to transmit. This transport stream TS has a video stream and a predetermined number of, that is, one or a plurality of audio streams including coded data of a plurality of groups.

Figure 2:
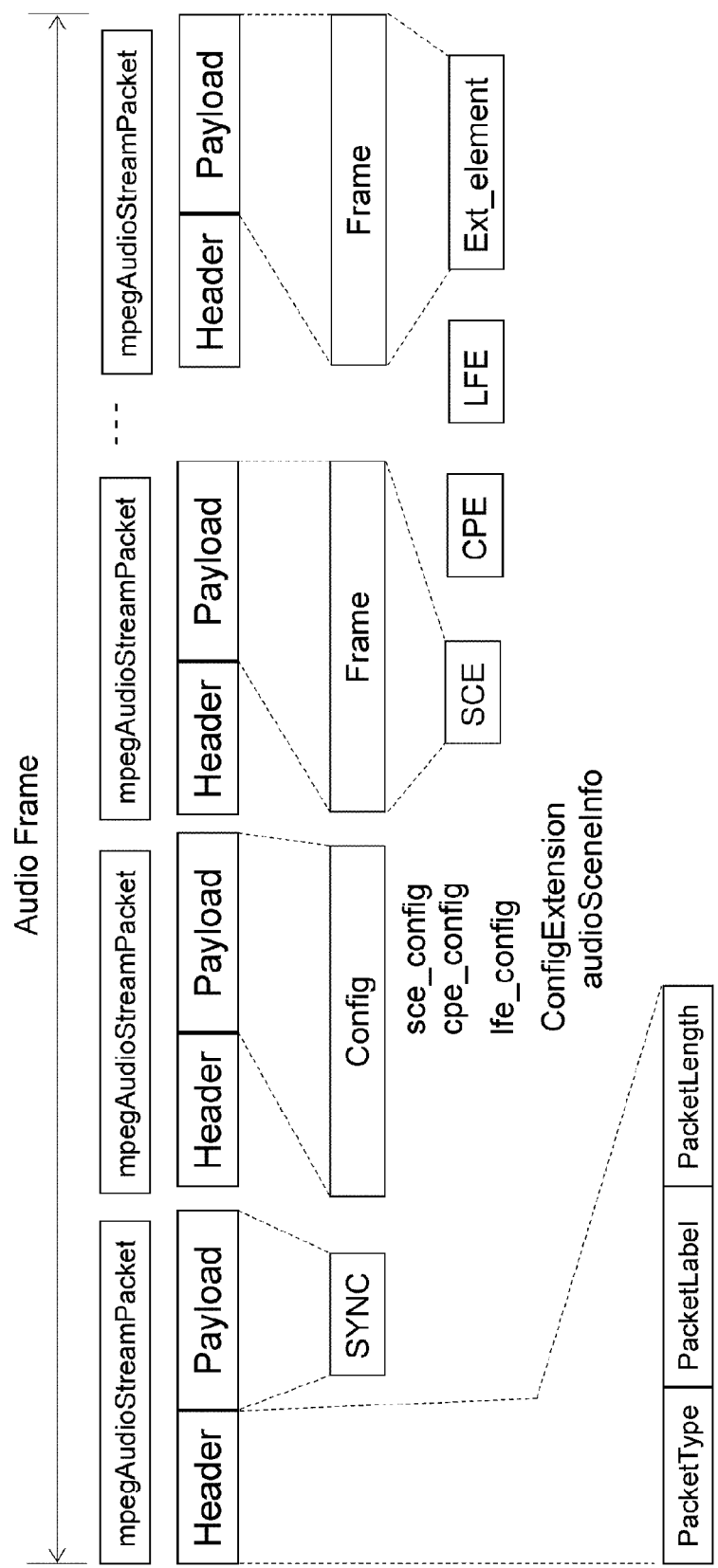
FIG. 2 is a diagram illustrating a structure of an audio frame of transmission data for 3D audio.

FIG. 2 illustrates an example of the structure of an audio frame of transmission data for 3D audio treated in this embodiment. This audio frame is made up of a plurality of MPEG audio stream packets (mpeg Audio Stream Packet). Each MPEG audio stream packet is constituted by a header (Header) and a payload (Payload).

The header has information such as a packet type (Packet Type), a packet label (Packet Label), and a packet length (Packet Length). In the payload, information defined by the packet type in the header is arranged. In this payload information, there are "SYNC" equivalent to a synchronous start code, "Frame" which is actual data of the transmission data for 3D audio, and "Config" indicating the configuration of this "Frame".

"Frame" includes channel coded data and object coded data constituting the transmission data for 3D audio. Here, the channel coded data is constituted by encoded sample data such as a single channel element (SCE), a channel pair element (CPE), and a low frequency element (LFE). In addition, the object coded data is constituted by encoded sample data of the single channel element (SCE) and metadata for rendering it by mapping it to a speaker present at an arbitrary position. This metadata is included therein as an extension element (Ext_element).

Figure 3:
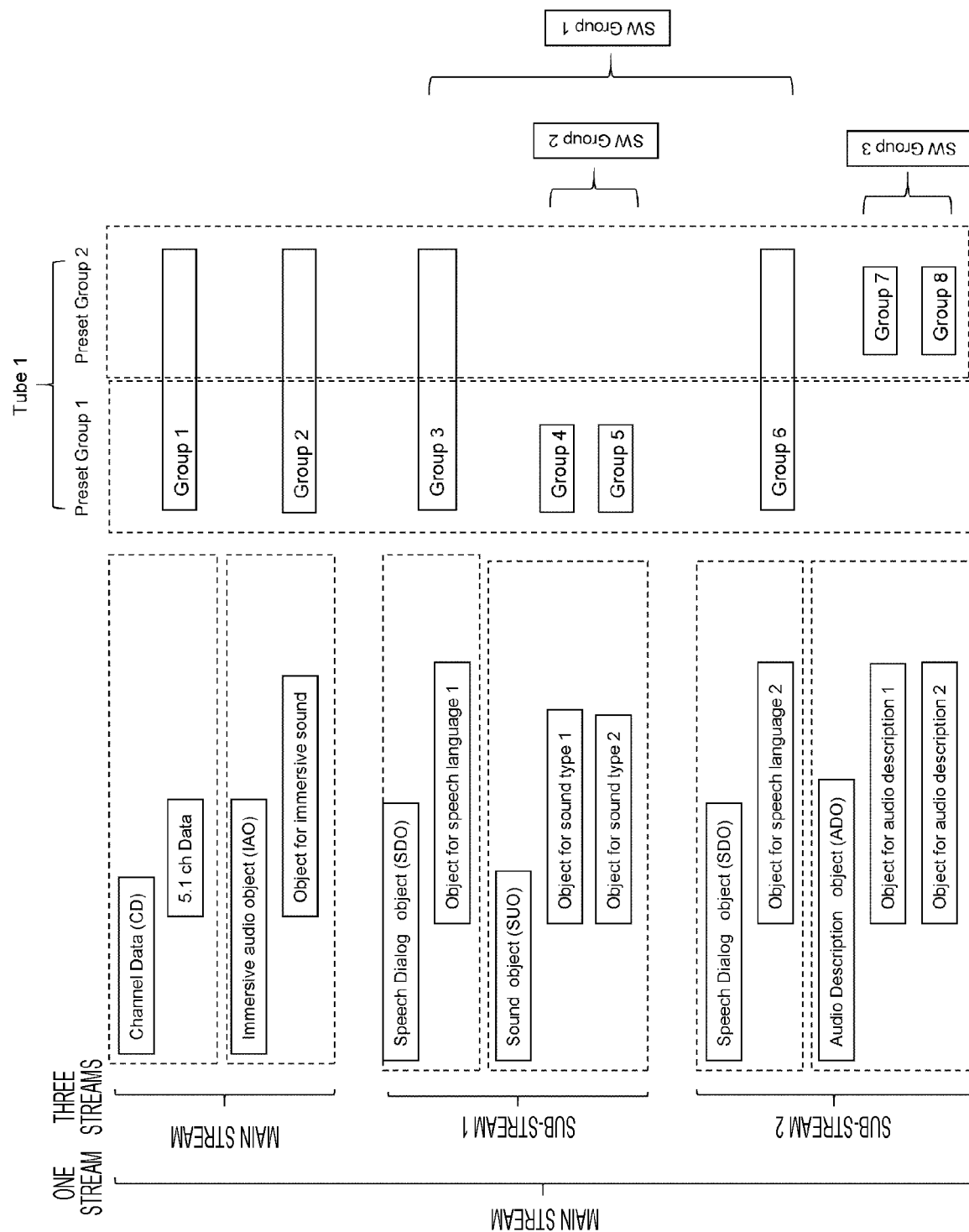
FIG. 3 is a diagram illustrating a configuration example of the transmission data for 3D audio.

FIG. 3 illustrates a configuration example of the transmission data for 3D audio. In this configuration example, the transmission data for 3D audio is made up of one piece of the channel coded data and four pieces of the object coded data. The one piece of the channel coded data is channel coded data (CD) for 5.1 channels.

The four pieces of the object coded data are coded data of an immersive audio object (IAO: Immersive audio object), a speech dialog object (SDO: Speech Dialog object), a sound object (SUO: Sound object) and an audio description object (ADO: Audio Description object).

Immersive audio object coded data is object coded data for an immersive sound. Speech dialog object coded data is object coded data for a speech language. In this configuration example, there is speech dialog object coded data corresponding to each of first and second languages.

Sound object coded data is object coded data for a sound. In this example, there is sound object coded data corresponding to each of first and second types. Audio description object coded data is object coded data for an audio description. In this example, there is audio description object coded data corresponding to each of first and second descriptions.

The coded data is distinguished by a concept of group (Group) by class. In this configuration example, the channel coded data for 5.1 channels is assigned to group 1 (Group 1), the immersive audio object coded data is assigned to group 2 (Group 2), the speech dialog object coded data associated with the first language is assigned to group 3 (Group 3), and the speech dialog object coded data associated with the second language is assigned to group 6 (Group 6).

In addition, in this configuration example, the sound object coded data associated with the first type is assigned to group 4 (Group 4), the sound object coded data associated with the second type is assigned to group 5 (Group 5), the audio description object coded data associated with the first description is assigned to group 7 (Group 7), and the audio description object coded data associated with the second description is assigned to group 8 (Group 8).

Meanwhile, an item that can be selected from among groups at a receiving side is registered in a switch group (SW Group) to be coded. In this configuration example, group 3 and group 6 are assigned to switch group 1 (SW Group 1), group 4 and group 5 are assigned to switch group 2 (SW Group 2), and group 7 and group 8 are assigned to switch group 3 (SW Group 3).

In addition, groups are bundled to be assigned to a preset group (preset Group) such that playback according to a use case is made possible. In this configuration example, group 1, group 2, group 3, group 4, group 5 and group 6 are bundled to be assigned to preset group 1 (preset Group 1), while group 1, group 2, group 3, group 6, group 7 and group 8 are bundled to be assigned to preset group 2 (preset Group 2).

Here, preset group 1 and preset group 2 are included in tube 1 (Tube 1). Note that, when the preset group is selected, one preset group is selected from each tube (Tube).

Figure 4:
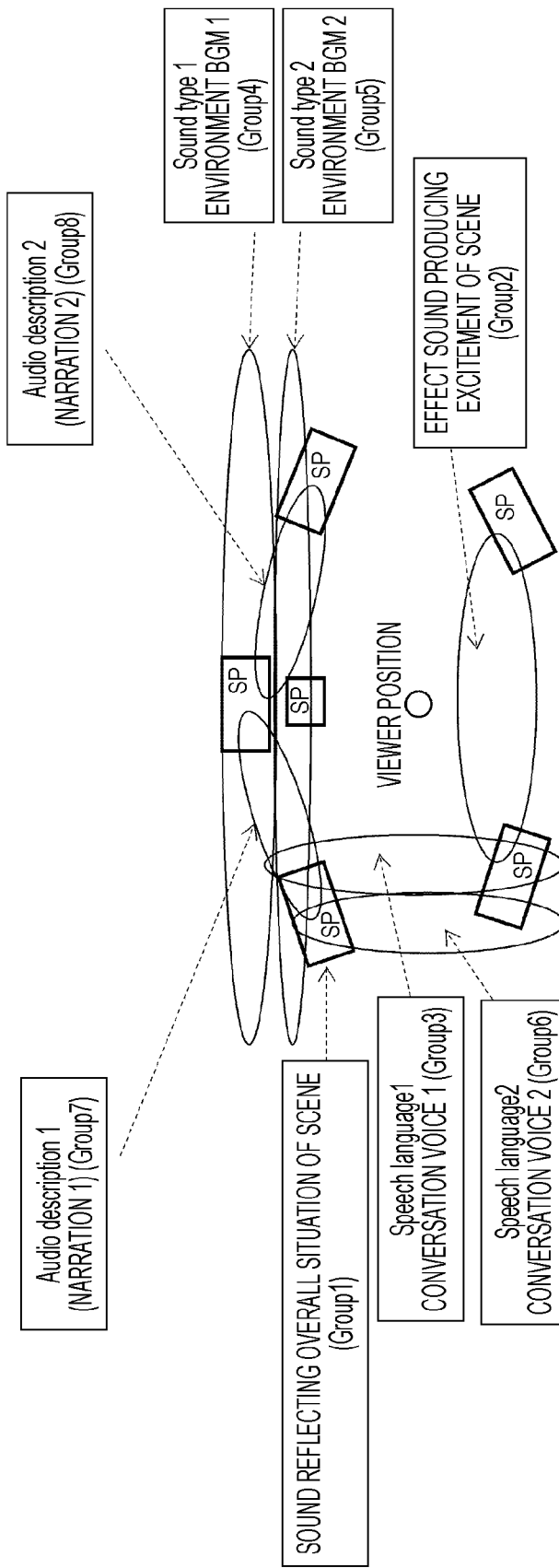
FIG. 4 is a diagram schematically illustrating an example of sound field reproduction using coded data of respective groups.

FIG. 4 schematically illustrates an example of sound field reproduction using the coded data of the respective groups. A sound reflecting the overall situation of a scene is reproduced by the channel coded data of group 1. Only this sound is coded as channel data for a target speaker (SP) position. Other voices and sounds are coded as object audio and rendered depending on a speaker position in an audio-visual environment without specifying the speaker position at the time of coding such that the rendered audio is mixed and finally output from each speaker.

An effect sound producing the excitement of a scene is reproduced by the immersive audio object coded data of group 2. Conversation voice 1 is reproduced by the speech dialog object coded data of group 3 associated with the first language. Conversation voice 2 is reproduced by the speech dialog object coded data of group 6 associated with the second language.

Environment BGM 1 (background music 1) is reproduced by the sound object coded data associated with the first type. Environment BGM 2 (background music 2) is reproduced by the sound object coded data associated with the second type. Narration 1 is reproduced by the audio description object coded data associated with the first description. Narration 2 is reproduced by the audio description object coded data associated with the second description.

Returning to FIG. 1, the service transmitter 100 transmits the transmission data for 3D audio including the coded data of the plurality of groups as described above in one stream or plural streams (multiple streams).

FIG. 5(a) schematically illustrates a configuration example of the audio frame in the case of transmission in one stream (main stream) in the configuration example of the transmission data for 3D audio in FIG. 3. In this case, the channel coded data (CD), the immersive audio object coded data (IAO), the speech dialog object coded data (SDO), the sound object coded data (SUO), and the audio description object coded data (ADO) are included in this one stream together with "SYNC" and "Config".

FIG. 5(b) schematically illustrates a configuration example of the audio frame in the case of transmission in multiple streams, here, three streams in the configuration example of the transmission data for 3D audio in FIG. 3. In this case, the channel coded data (CD) and the immersive audio object coded data (IAO) are included in the main stream together with "SYNC" and "Config".

The speech dialog object coded data (SDO) and the sound object coded data (SUO) are included in sub-stream (auxiliary stream) 1 together with "SYNC" and "Config". The speech dialog object coded data (SDO) and the audio description object coded data (ADO) are included in sub-stream (auxiliary stream) 2 together with "SYNC" and "Config".

In this case, as illustrated in FIG. 3, for example, groups 1 and 2 are included in the main stream, groups 3, 4, and 5 are included in sub-stream 1, and groups 6, 7, and 8 are included in sub-stream 2.

FIG. 6 illustrates correspondence relationships between groups and streams, and so on in the case of transmission in three streams. Here, a group ID (group ID) is an identifier for identifying the group. An attribute (attribute) represents the attribute of coded data of each group. A switch group ID (switch Group ID) is an identifier for identifying a switching group. A preset group ID (preset Group ID) is an identifier for identifying the preset group. A stream ID (Stream ID) is an identifier for identifying the stream. A kind (Kind) represents the class of content of each group.

The correspondence relationships illustrated in FIG. 6 indicate that the coded data belonging to group 1 is the channel coded data and does not constitute a switch group but is included in stream 1 (main stream). The correspondence relationships illustrated in FIG. 6 also indicate that the coded data belonging to group 2 is the immersive audio object coded data and does not constitute a switch group but is included in stream 1 (main stream).

The correspondence relationships illustrated in FIG. 6 also indicate that the coded data belonging to group 3 is the speech dialog object coded data associated with the first language, constitutes switch group 1, and is included in stream 2 (sub-stream 1). The correspondence relationships illustrated in FIG. 6 also indicate that the coded data belonging to group 4 is the sound object coded data associated with the first type, constitutes switch group 2, and is included in stream 2 (sub-stream 1).

The correspondence relationships illustrated in FIG. 6 also indicate that the coded data belonging to group 5 is the sound object coded data associated with the second type, constitutes switch group 2, and is included in stream 2 (sub-stream 1). The correspondence relationships illustrated in FIG. 6 also indicate that the coded data belonging to group 6 is the speech dialog object coded data associated with the second language, constitutes switch group 1, and is included in stream 3 (sub-stream 2).

The correspondence relationships illustrated in FIG. 6 also indicate that the coded data belonging to group 7 is the audio description object coded data associated with the first description, constitutes switch group 3, and is included in stream 3 (sub-stream 2). The correspondence relationships illustrated in FIG. 6 also indicate that the coded data belonging to group 8 is the audio description object coded data associated with the second description, constitutes switch group 3, and is included in stream 3 (sub-stream 2).

In addition, the correspondence relationships illustrated in FIG. 6 indicate that preset group 1 includes group 1, group 2, group 3, group 4, group 5, and group 6. Furthermore, the correspondence relationships illustrated in FIG. 6 indicate that preset group 2 includes group 1, group 2, group 3, group 6, group 7, and group 8.

Note that, in the case of transmission in one stream, since the coded data of all the groups are included in stream 1 (main stream), "1" is given to all "Stream IDs" in FIG. 6.

Returning to FIG. 1, the service transmitter 100 inserts, into a container (transport stream TS), transmission data configuration information on 3D audio, that is, information indicating the correspondence relationships between "groupID" and "attribute", "switchGroupID", "presetGroupID", "StreamID", and the like (refer to FIG. 6). In addition, the service receiver 100 inserts, into the container, command information for creating a command specifying a group to be decoded from among the plurality of groups. This command information includes information indicating correspondence relationships between the commands and the groups, information indicating correspondence relationships between the commands and the preset groups, and so on.

Figure 7:
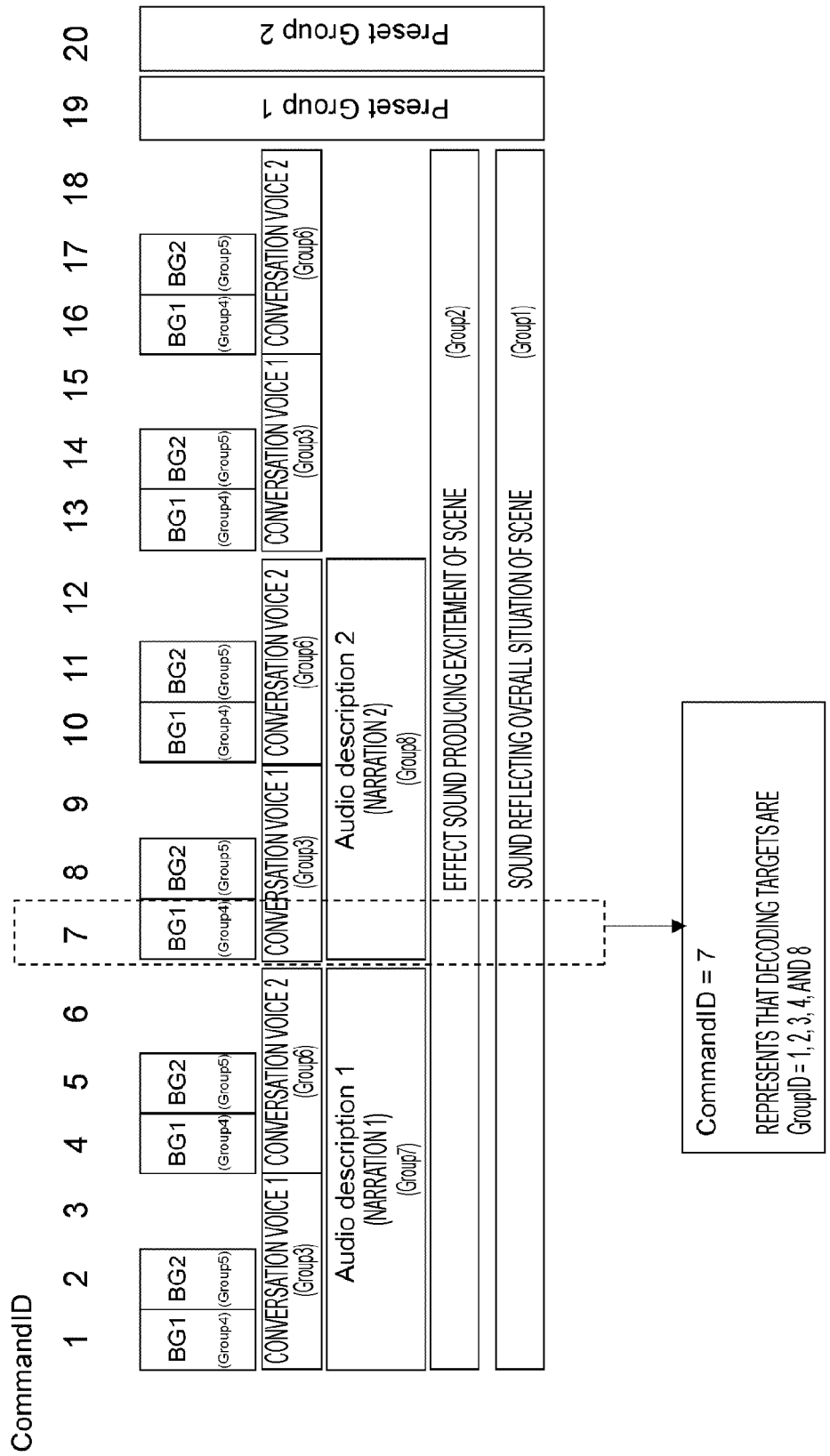
FIG. 7 is a diagram illustrating an example of correspondence relationships of commands (command identifiers: CommandIDs) with the groups and preset groups.

FIG. 7 illustrates an example of correspondence relationships of the commands (command identifiers: CommandIDs) with the groups and the preset groups. Each of portions of commands "1" to "18" represents a correspondence relationship of a command with a group (a set of groups) indicated by this command to be a decoding target. For example, the command "7" represents that groups 1, 2, 3, 4, and 8 should be assigned as decoding targets. In addition, each of portions of the commands "19" and "20" represents a correspondence relationship of a command with a preset group indicated by this command to be a decoding target. For example, the command "19" represents that preset group 1 should be assigned as a decoding target.

The service transmitter 100 inserts the transmission data configuration information and the command information into, for example, an audio elementary stream loop corresponding to a main stream present under a program map table (PMT: Program Map Table). In this case, the service transmitter 100 inserts the transmission data configuration information and the command information by inserting a 3D audio stream configuration descriptor (3Daudio_stream_config_descriptor) into the audio elementary stream loop corresponding to this main stream. As a matter of course, it is also possible to additionally insert the transmission data configuration information and the command information into an audio elementary stream loop corresponding to the sub-stream.

In addition, the service transmitter 100 inserts stream identifier information indicating a stream identifier of each of the predetermined number of audio streams into, for example, the audio elementary stream loop corresponding to each of the predetermined number of audio streams present under the program map table (PMT: Program Map Table) in the container. In this case, the service transmitter 100 inserts the stream identifier information by inserting a 3D audio stream ID descriptor (3Daudio_streamID_descriptor) into the audio elementary stream loop corresponding to each audio stream.

Furthermore, the service transmitter 100 inserts the transmission data configuration information and the command information into the audio stream. The service transmitter 100 inserts the transmission data configuration information and the command information into, for example, a PES payload of a PES packet of the main stream. As a matter of course, it is also possible to additionally insert the transmission data configuration information and the command information into the PES payload of the PES packet of the sub-stream.

As illustrated in FIGS. 5(a) and 5(b), the service transmitter 100 inserts the transmission data configuration information and the command information by inserting the 3D audio stream configuration descriptor (3Daudio_stream_config_descriptor) between "SYNC" and "Config" as descriptor information "Desc".

Note that this embodiment has indicated the example of inserting the transmission data configuration information and the command information into both of the container and the audio stream as described above, but it is also conceivable to insert these pieces of information into only the container or only the audio stream.

In addition, the service transmitter 100 provides a command insertion area for the receiving side to insert a command (command identifier: CommandID) for specifying a group to be decoded, in at least one audio stream among the predetermined number of audio streams. The service transmitter 100 inserts the command insertion area into, for example, the PES payload of the PES packet of the main stream.

As illustrated in FIGS. 5(a) and 5(b), the service transmitter 100 provides the command insertion area by inserting a 3D audio command descriptor (3Daudio_command_descriptor) between the "SYNC" and "Config" as the descriptor information "Desc".

Figure 8:
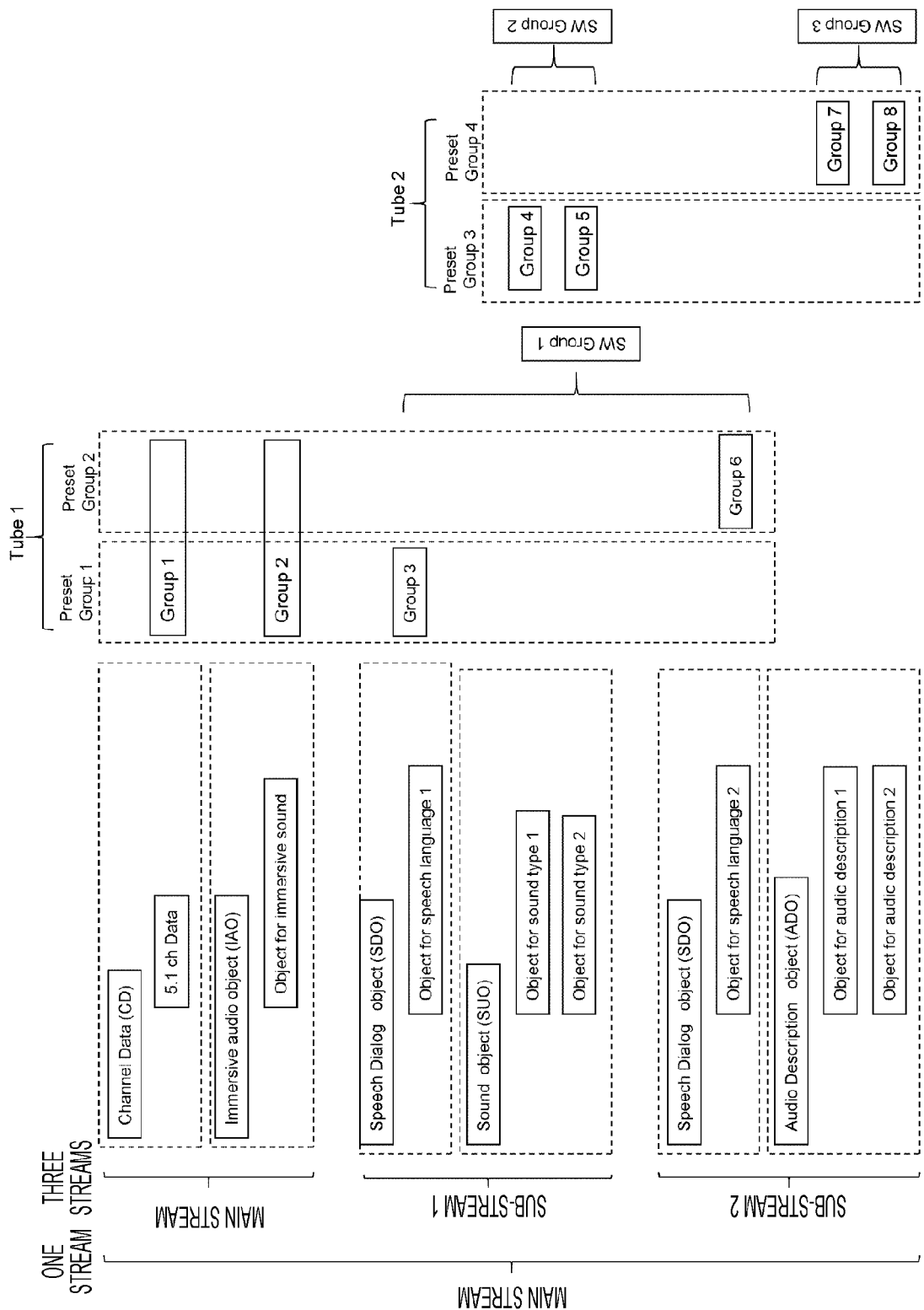
FIG. 8 is a diagram illustrating another configuration example of the transmission data for 3D audio.

FIG. 8 illustrates another configuration example of the transmission data for 3D audio. In this configuration example, the setting of the preset groups is different from the configuration example of the transmission data for 3D audio in FIG. 3. Other settings are the same.

That is, in this configuration example, group 1, group 2, and group 3 are bundled to be assigned to preset group 1 (preset Group 1), while group 1, group 2, and group 6 are bundled to be assigned to preset group 2 (preset Group 2). Additionally, these preset group 1 and preset group 2 are included in tube 1 (Tube 1).

Meanwhile, group 4 and group 5 are bundled to be assigned to preset group 3 (preset Group 3), while group 7 and group 8 are bundled to be assigned to preset group 4 (preset Group 4). Additionally, these preset group 3 and preset group 4 are included in tube 2 (Tube 2).

FIG. 9 illustrates correspondence relationships between groups and streams, and so on in the case of transmission in three streams, which corresponds to the configuration example of the transmission data for 3D audio in FIG. 8. FIG. 9 is the same as FIG. 6 except for a portion of the items of the preset group ID (preset Group ID). Note that, in the case of transmission in one stream, since the coded data of all the groups are included in stream 1 (main stream), "1" is given to all "Stream IDs" in FIG. 9.

Figure 10:
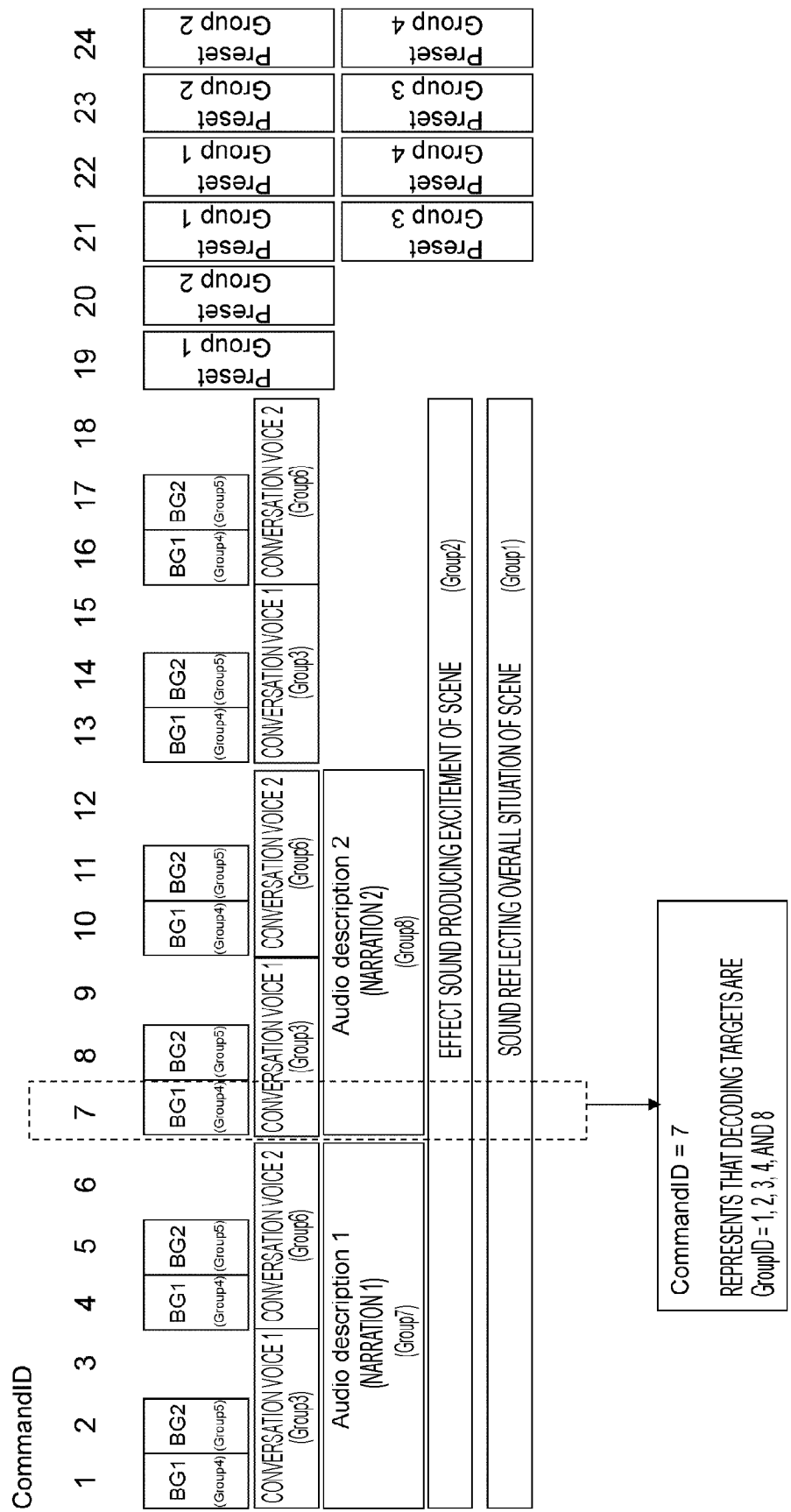
FIG. 10 is a diagram illustrating an example of correspondence relationships of commands (command identifiers: CommandIDs) with the groups and the preset groups.

FIG. 10 illustrates an example of correspondence relationships of the commands (command identifiers: CommandIDs) with the groups and the preset groups, which corresponds to the configuration example of the transmission data for 3D audio in FIG. 8. FIG. 10 is the same as FIG. 7 except for a portion of the correspondence relationships with the preset groups.

That is, each of portions of commands "19" to "24" represents a correspondence relationship of a command with a preset group indicated by this command to be a decoding target. For example, the command "19" represents that preset group 1 should be assigned as a decoding target. In addition, for example, the command "21" represents that preset group 1 and preset group 3 should be assigned as decoding targets.

Returning to FIG. 1, the service receiver 200 receives the transport stream TS sent from the service transmitter 100 by being incorporated into the broadcasting wave or a packet in a network. As described above, this transport stream TS has, in addition to the video stream, a predetermined number of audio streams including the coded data of the plurality of groups constituting the transmission data for 3D audio. The transmission data configuration information and the command information are inserted in the container and/or the audio stream.

The service receiver 200 determines a group to be decoded on the basis of the transmission data configuration information and a user selection operation as well as processing function of a system and so on. At this time, the service receiver 200 displays a user interface (UI) screen for the user to perform a selection operation, on the basis of the transmission data configuration information. The user performs a selection operation on this UI screen.

Figure 11:
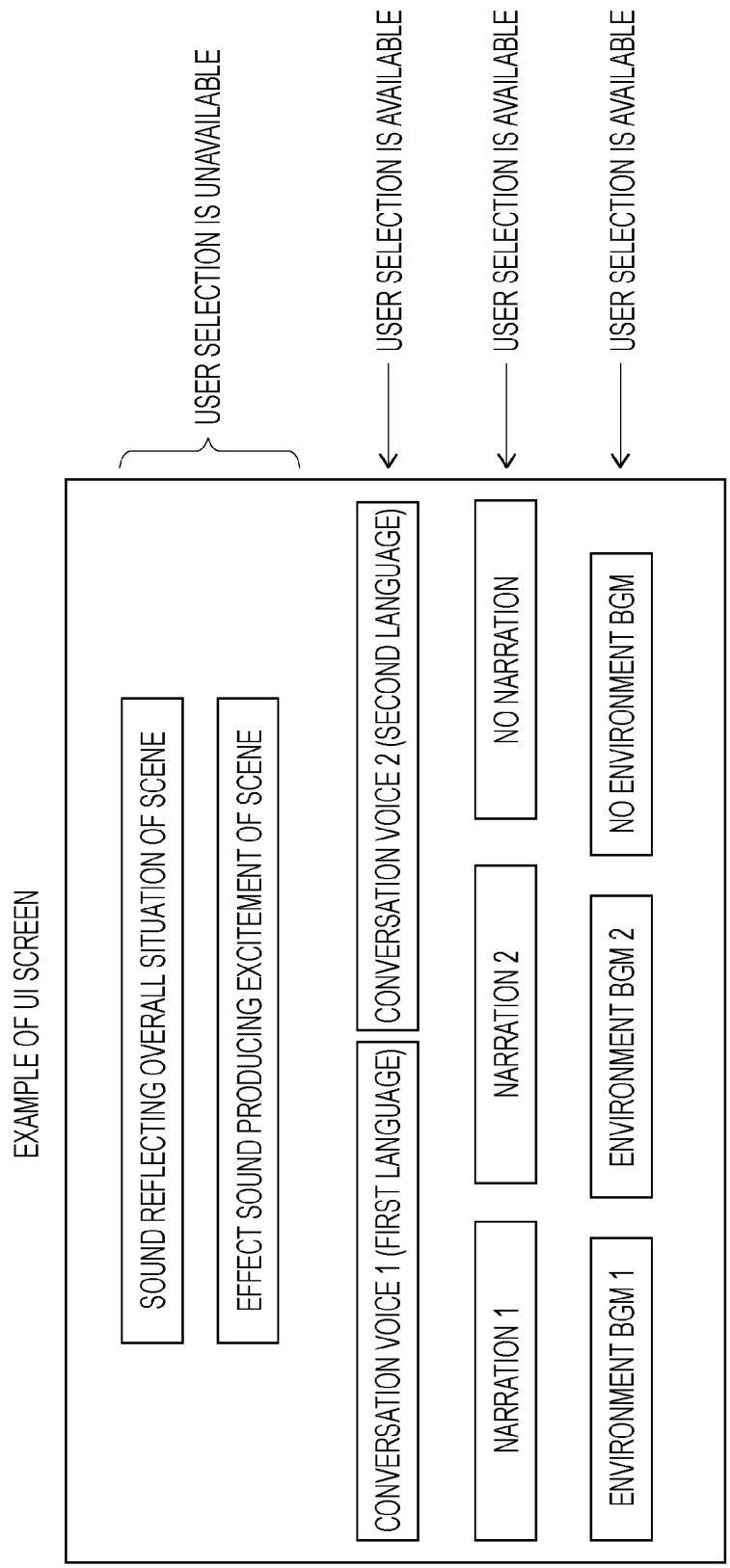
FIG. 11 is a diagram illustrating an example of a user interface (UI) screen for a user to perform a selection operation.

FIG. 11 illustrates an example of the UI screen corresponding to the configuration examples of the transmission data for 3D audio illustrated in FIGS. 3 and 8. User selection is not available for the user as for "sound reflecting the overall situation of a scene" reproduced with the channel coded data distinguished by group 1 and accordingly, group 1 is determined as a group to be decoded. In addition, user selection is not available as for "effect sound producing the excitement of a scene" reproduced with the immersive audio object coded data distinguished by group 2 and accordingly, group 1 is determined as a group to be decoded.

Meanwhile, user selection is available as for "conversation voice 1 (first language)" reproduced with the speech dialog object coded data associated with the first language, which is distinguished by group 3, and "conversation voice 2 (second language)" reproduced with the speech dialog object coded data associated with the second language, which is distinguished by group 6. Group 3 is determined as a group to be decoded in a case where the user performs a selection operation for conversation voice 1, while group 6 is determined as a group to be decoded in a case where the user performs a selection operation for conversation voice 2.

Additionally, user selection is available as for "environment BGM 1" reproduced with the sound object coded data associated with the first type, which is distinguished by group 4, and "environment BGM 2" reproduced with the sound object coded data associated with the second type, which is distinguished by group 5. In this case, "no environment BGM" is also employed as an option.

Group 4 is determined as a group to be decoded in a case where the user performs a selection operation for environment BGM 1, while group 5 is determined as a group to be decoded in a case where the user performs a selection operation for environment BGM 2. In addition, in a case where the user performs a selection operation for no environment BGM, neither group 4 nor 5 is determined as a group to be decoded.

Furthermore, user selection is available as for "narration 1" reproduced with the audio description object coded data associated with the first description, which is distinguished by group 7, and "narration 2" reproduced with the audio description object coded data associated with the second description, which is distinguished by group 8. In this case, "no narration" is also employed as an option.

Group 7 is determined as a group to be decoded in a case where the user performs a selection operation for narration 1, while group 8 is determined as a group to be decoded in a case where the user performs a selection operation for narration 2. In addition, in a case where the user performs a selection operation for no narration, neither group 7 nor 8 is determined as a group to be decoded.

The service receiver 200 fetches and integrates all the audio streams including a group determined to be decoded from the predetermined number of audio streams that has been received and acquires one audio stream. In this case, when the predetermined number of audio streams includes only one, this audio stream becomes the one audio stream as it is.

The command insertion area for the receiving side to insert a command (command identifier: CommandID) for specifying a group to be decoded is provided in at least one audio stream among the predetermined number of audio streams that has been received. Therefore, there is the command insertion area in this one audio stream.

The service receiver 200 inserts a command for specifying the group to be decoded, which has been determined as described above, into this one audio stream. In this case, the service receiver 200 inserts the command into the command insertion area.

The service receiver 200 creates a command to be inserted, for example, with reference to the command information (refer to FIGS. 7 and 10). For example, when groups 1, 2, 3, 4, and 8 are groups to be decoded, "Command ID"="7" is inserted. Note that the service receiver 200 can also independently and individually create a command to be inserted without using the command included in the command information or together with the command included in the command information to use the command.

The service receiver 200 sends one audio stream into which the command has been inserted to an audio decoder such that the decoding processing is applied to the coded data of a group to be decoded, which has been specified by the command from among the predetermined number of groups included in this one audio stream, and audio output for 3D audio is obtained.

[Stream Generation Unit of Service Transmitter]

Figure 12:
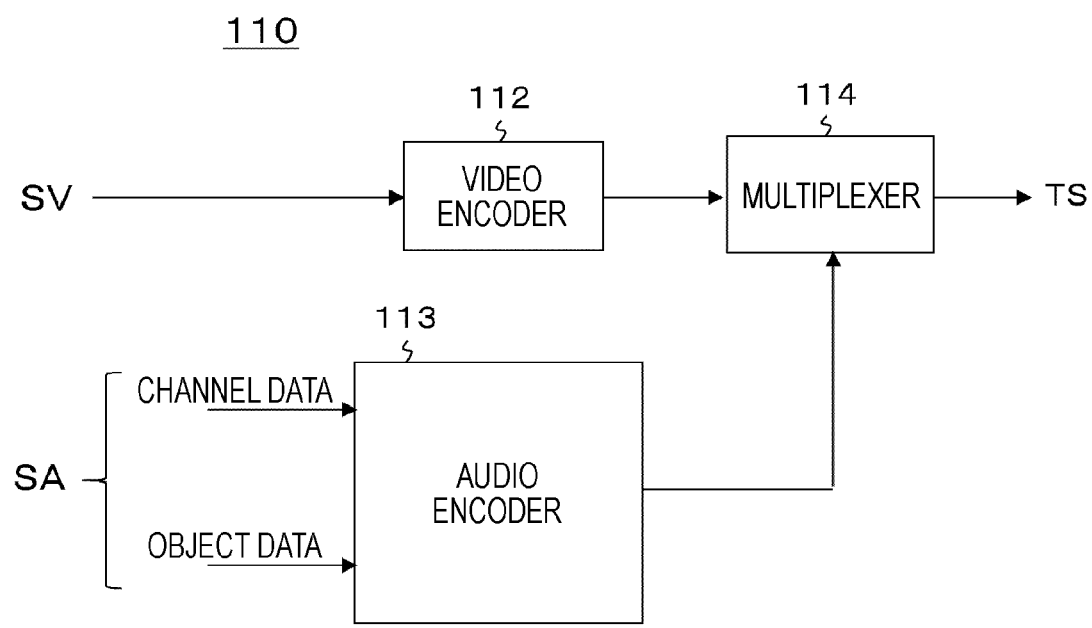
FIG. 12 is a block diagram illustrating a configuration example of a stream generation unit included in a service transmitter.

FIG. 12 illustrates a configuration example of a stream generation unit 110 included in the service transmitter 100. This stream generation unit 110 has a video encoder 112, an audio encoder 113, and a multiplexer 114. As illustrated in FIGS. 3 and 8, an example is used here in which the transmission data for audio is made up of one piece of coded channel data and four pieces of the object coded data.

The video encoder 112 accepts the input of video data SV to apply coding to this video data SV and generates a video stream (video elementary stream). The audio encoder 113 accepts the input of object data of an immersive audio, a speech dialog, a sound object, and an audio description object as audio data SA together with channel data.

The audio encoder 113 applies coding to the audio data SA to obtain the transmission data for 3D audio. As illustrated in FIGS. 3 and 8, the channel coded data (CD), the immersive audio object coded data (IAO), the speech dialog object coded data (SDO), the sound object coded data (SUO), and the audio description object coded data (ADO) are included in this transmission data for 3D audio.

The audio encoder 113 generates one or a plurality of audio streams (audio elementary streams) including the coded data of a plurality of groups, here, eight groups (refer to FIGS. 5(a) and 5(b)). At this time, the audio encoder 113 inserts the transmission data configuration information and the command information into at least one or more audio streams among a predetermined number of audio streams, for example, a main stream, and additionally provides the command insertion area therein.

Specifically, the audio encoder 113 inserts the 3D audio stream configuration descriptor (3Daudio_stream_config_descriptor) including the transmission data configuration information and the command information and additionally inserts the 3D audio command descriptor (3Daudio_command_descriptor) constituting the command insertion area between "SYNC" and "Config" as the descriptor information ("Desc").

The multiplexer 114 separately converts the video stream output from the video encoder 112 and the predetermined number of audio streams output from the audio encoder 113 into PES packets and further converts the PES packets into transport packets to multiplex, thereby obtaining a transport stream TS as a multiplexed stream.

At this time, the multiplexer 114 inserts the transmission data configuration information and the command information into the transport stream TS as a container. Specifically, the multiplexer 114 inserts the 3D audio stream configuration descriptor (3Daudio_stream_config_descriptor) into at least one or more audio streams among the predetermined number of audio streams, for example, into an audio elementary stream loop corresponding to the main stream.

In addition, the multiplexer 114 inserts the stream identifier information indicating respective stream identifiers of the predetermined number of audio streams into the transport stream TS as a container. Specifically, the multiplexer 114 inserts the 3D audio stream ID descriptor (3Daudio_streamID_descriptor) into an audio elementary stream loop corresponding to each of the predetermined number of audio streams.

The action of the stream generation unit 110 illustrated in FIG. 12 will be briefly described. The video data is supplied to the video encoder 112. In this video encoder 112, coding is applied to the video data SV such that a video stream including coded video data is generated. This video stream is supplied to the multiplexer 114.

The audio data SA is supplied to the audio encoder 113. This audio data SA includes the channel data and object data of an immersive audio, a speech dialog, a sound object, and an audio description object. In the audio encoder 113, coding is applied to the audio data SA to obtain the transmission data for 3D audio.

In addition to the channel coded data (CD), the immersive audio object coded data (IAO), the speech dialog object coded data (SDO), the sound object coded data (SUO), and the audio description object coded data (ADO) are included in this transmission data for 3D audio (refer to FIGS. 3 and 8). In this audio encoder 113, one or a plurality of audio streams including the coded data of the eight groups is generated (refer FIGS. 5(a) and 5(b)).

At this time, in the audio encoder 113, the 3D audio stream configuration descriptor (3Daudio_stream_config_descriptor) including the transmission data configuration information and the command information is inserted and additionally, the 3D audio command descriptor (3Daudio_command_descriptor) constituting the command insertion area is inserted between "SYNC" and "Config" as the descriptor information ("Desc").

The video stream generated by the video encoder 112 is supplied to the multiplexer 114. Meanwhile, the audio stream generated by the audio encoder 113 is supplied to the multiplexer 114. In the multiplexer 114, the streams supplied from the respective encoders are converted into PES packets and further converted into transport packets to be multiplexed, whereby a transport stream TS is obtained as a multiplexed stream.

In addition, in the multiplexer 114, for example, the 3D audio stream configuration descriptor (3Daudio_stream_config_descriptor) including the transmission data configuration information and the command information is inserted into the audio elementary stream loop corresponding to the main stream. Furthermore, in the multiplexer 114, the 3D audio stream ID descriptor (3Daudio_streamID_descriptor) including the stream identifier information is inserted into the audio elementary stream loop corresponding to each of the predetermined number of audio streams.

[Structure of 3D Audio Stream Configuration Descriptor]

FIGS. 13 and 14 illustrate an example of the structure (Syntax) of the 3D audio stream configuration descriptor (3Daudio_stream_config_descriptor). Meanwhile, FIG. 15 illustrates the contents of primary information (Semantics) in the above example of the structure.

An eight-bit field of "descriptor_tag" represents a descriptor type. "descriptor_tag" here represents that it is a 3D audio stream configuration descriptor. An eight-bit field of "descriptor_length" represents a length (size) of the descriptor and indicates the number of subsequent bytes as the length of the descriptor.

An eight-bit field of "NumOfGroups, N" represents the number of groups N. An eight-bit field of "NumOfPresetGroups, P" represents the number of preset groups P. An eight-bit field of "NumOfCommand; Q" represents the number of commands Q. There are an eight-bit field of "groupID", an eight-bit field of "attribute_of_groupID", an eight-bit field of "SwitchGroupID", an eight-bit field of "audio_streamID" and an eight-bit field of "content_kind" repeatedly as many as the number of groups N.

The "groupID" field represents the identifier of the group. The "attribute_of_groupID" field represents the attribute of the coded data of the corresponding group. The "SwitchGroupID" field is an identifier indicating which switch group the corresponding group belongs to. "0" represents that the corresponding group does not belong to any switch group. A value other than "0" represents the switch group to which the corresponding group belongs. The eight-bit field of "content_Kind" represents the class of content of the group. "Audio streamID" is an identifier indicating an audio stream including the corresponding group.

Furthermore, there are an eight-bit field of "presetGroupID" and an eight-bit field of "NumOfGroups_in_preset, R" repeatedly as many as the number of preset groups P. The "presetGroupID" field is an identifier indicating a bundle in which the group is preset. The "NumOfGroups_in_preset, R" field represents the number of groups R belonging to the preset group. Additionally, for each preset group, there are eight-bit fields of "groupID" repeatedly as many as the number of groups R belonging thereto and all the groups belonging to the preset group are indicated.

In addition, there are eight-bit fields of "CommandID" and one-bit fields of "selection type" repeatedly as many as the number of commands Q. The "CommandID" field is a command identifier and represents a decoding target. "selection_type" represents the type of command designation. "1" represents direct designation of a group, whereas "0" represents indirect designation of a group by designating a preset group.

When "selection_type" is "0", that is, when a preset group is designated as a decoding target, there is an eight-bit field of "Max_NumOfPresetGroups_in_command; W" for each command. This field represents the number of preset groups W included in one command. Here, a relationship of W ☐ "NumOfTubePresetGroup" is established. Note that "NumOfTubePresetGroup" represents the number of tubes (bundles: Tubes) of the preset groups and corresponds to the number of preset groups that can be designated simultaneously. It is assumed that all preset groups belong to one of these tubes. By repeatedly arranging the eight-bit field of "presetGroupID", all the preset groups designated as decoding targets are indicated.

Meanwhile, when "selection_type" is "1", that is, when a group is directly designated as a decoding target, there is an eight-bit field of "Max_NumOfGroups_in_command; S" for each command. This field represents the number of groups S included in one command. Additionally, there are eight-bit fields "groupID" repeatedly as many as the number of groups S and all the groups designated as decoding targets are indicated.

[Structure of 3D Audio Stream ID Descriptor] FIG. 16(*a*) illustrates an example of the structure (Syntax) of the 3D audio stream ID descriptor (3Daudio_streamID_descriptor). Meanwhile, FIG. 16(*b*) illustrates the contents of primary information (Semantics) in the above example of the structure.

An eight-bit field of "descriptor_tag" represents a descriptor type. "descriptor_tag" here represents that it is a 3D audio stream ID descriptor. An eight-bit field of "descriptor_length" represents a length (size) of the descriptor and indicates the number of subsequent bytes as the length of the descriptor. An eight-bit field of "audio_streamID" represents the identifier of the audio stream.

[Structure of 3D Audio Command Descriptor]

FIG. 17(*a*) illustrates an example of the structure (Syntax) of the 3D audio command descriptor (3Daudio_command_descriptor). Furthermore, FIG. 17(*b*) illustrates the contents of primary information (Semantics) in the above example of the structure.

An eight-bit field of "descriptor_tag" represents a descriptor type. "descriptor_tag" here represents that it is a 3D audio command descriptor. An eight-bit field of "descriptor_length" represents a length (size) of the descriptor and indicates the number of subsequent bytes as the length of the descriptor. An eight-bit field of "NumOfCommands, N" represents the number of commands N. Additionally, there are eight-bit fields of "CommandID" repeatedly as many as the number of commands N.

Note that, at the time when the service transmitter 100 inserts the 3D audio command descriptor into the audio stream, the value of "N" is determined in consideration of the maximum number of commands to be inserted at the receiving side, while invalid values, for example, all zeros are inserted into the fields of "CommandID".

[Configuration of Transport Stream TS]

Figure 5:
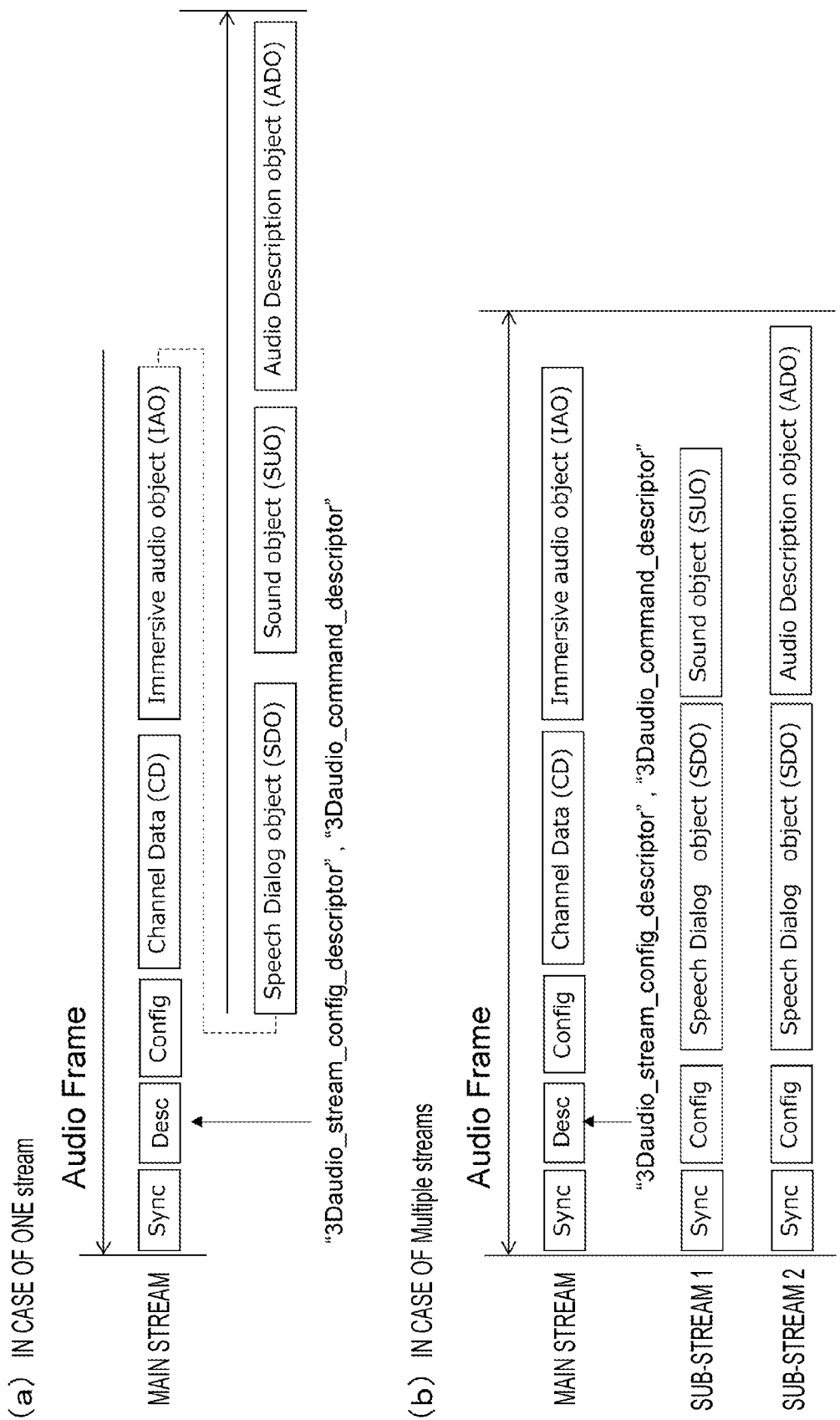
FIG. 5 is a diagram schematically illustrating configuration examples of the audio frame in a case where the transmission data for 3D audio is transmitted in one stream and in a case where the transmission data for 3D audio is transmitted in plural streams.
Figure 18:
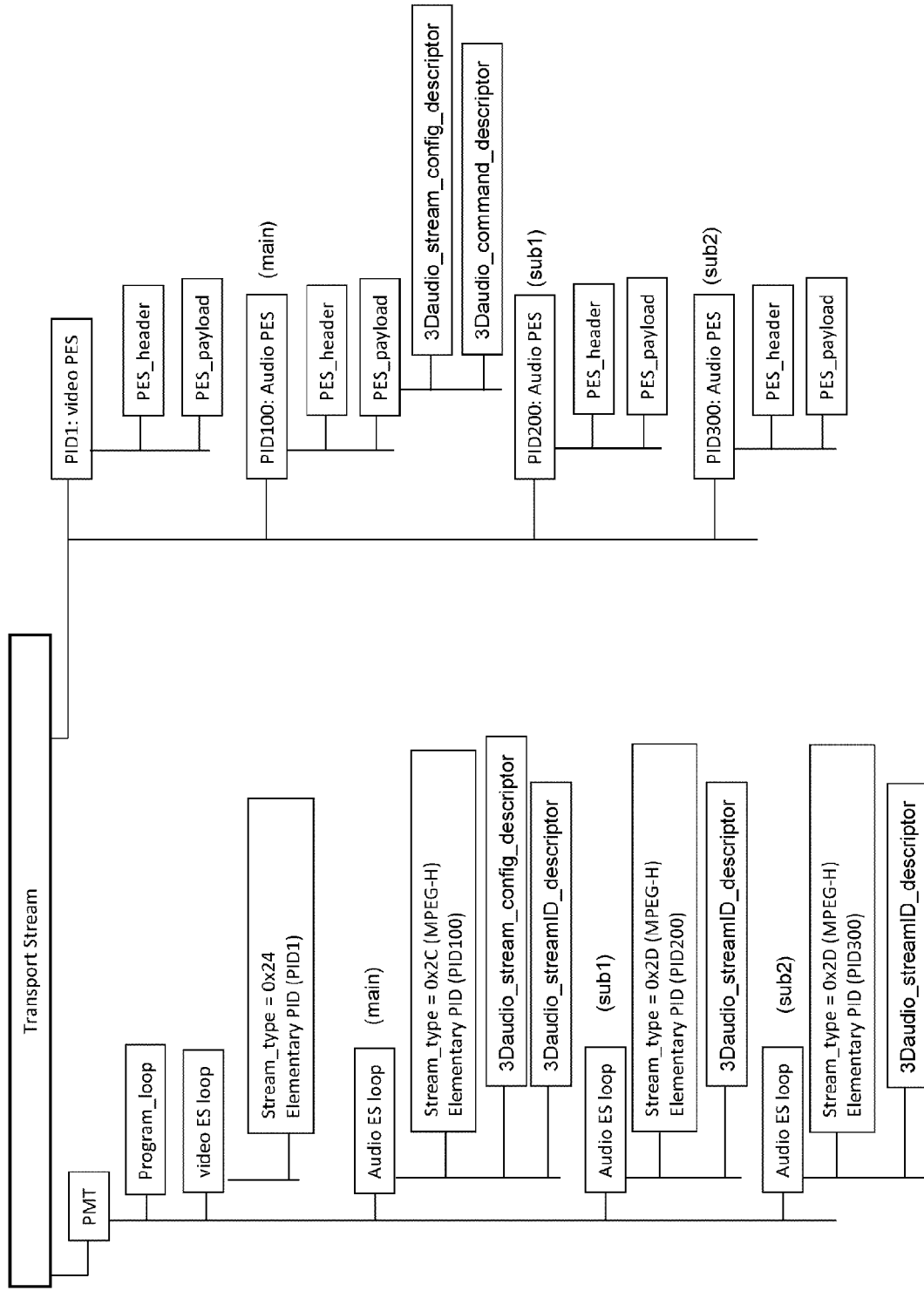
FIG. 18 is a diagram illustrating a configuration example of a transport stream TS in a case where the transmission data for 3D audio is transmitted in three streams.

FIG. 18 illustrates a configuration example of the transport stream TS in a case where the transmission data for 3D audio is transmitted in three streams, namely, a main stream, sub-stream 1, and sub-stream 2 (refer to FIGS. 3 and 5(*b*)). According to this configuration example, there is a PES packet "video PES" of a video stream identified by PID1. In addition, in this configuration example, there are PES packets "audio PES" of three audio streams separately identified by PID100, PID200, and PID300. The PES packet is made up of a PES header (PES header) and a PES payload (PES payload).

The channel coded data (CD) distinguished as group 1 and the immersive audio object coded data (IAO) distinguished as group 2 are included within the PES payload of the PES packet of the audio stream identified by PID100 (main stream). Then, the descriptor information "Desc" on the 3D audio stream configuration descriptor (3Daudio_stream_config_descriptor) and the 3D audio command descriptor (3Daudio_command_descriptor) is inserted into this PES payload (refer to FIG. 5(*b*)).

Meanwhile, the speech dialog object coded data (SDO) distinguished as group 3 and the sound object coded data (SUO) distinguished as groups 4 and 5 are included within the PES payload of the PES packet of the audio stream identified by PID200 (sub-stream 1). In addition, the speech dialog object coded data (SDO) distinguished as group 6 and the audio description object coded data (ADO) distinguished as groups 7 and 8 are included within the PES payload of the PES packet of the audio stream identified by PID300 (sub-stream 2).

Additionally, the program map table (PMT) is included in the transport stream TS as program specific information (PSI). The PSI is information mentioning which program is the one to which each of the elementary streams included in the transport stream belongs. The PMT has a program loop (Program loop) stating information relating to the whole program.

In addition, the PMT has an elementary stream loop having information relating to each of the elementary streams. In this configuration example, there is a video elementary stream loop (video ES loop) corresponding to the video stream and additionally, there are audio elementary stream loops (audio ES loops) corresponding to the three audio streams.

Information such as a stream type and a packet identifier (PID) is arranged in the video elementary stream loop (video ES loop) so as to correspond to the video stream and at the same time, a descriptor stating information relating to this video stream is also arranged therein. The value of "Stream type" for this video stream is set to "0x24", whereas PID information is configured so as to indicate PID1 given to the PES packet "video PES" of the video stream as described above.

Information such as a stream type and a packet identifier (PID) is arranged in each of the audio elementary stream loops (audio ES loops) so as to correspond to the audio stream and at the same time, a descriptor stating information relating to this audio stream is also arranged therein. The value of "Stream type" for the main stream is set to "0x2C", whereas PID information is configured so as to indicate PID100 given to the PES packet "audio PES" of the main stream as described above.

Meanwhile, the value of "Stream type" for sub-stream 1 is set to "0x2D", whereas PID information is configured so as to indicate PID200 given to the PES packet "audio PES" of sub-stream 1 as described above. In addition, the value of "Stream type" for sub-stream 2 is set to "0x2D", whereas PID information is configured so as to indicate PID300 given to the PES packet "audio PES" of sub-stream 2 as described above.

The 3D audio stream configuration descriptor (3Daudio_stream_config_descriptor) and the 3D audio stream ID descriptor (3Daudio_streamID_descriptor) are arranged in the audio elementary stream loop (audio ES loop) corresponding to the main stream. Additionally, the 3D audio stream ID descriptor is arranged in the audio elementary stream loop (audio ES loop) corresponding to each of sub-streams 1 and 2.

Figure 19:
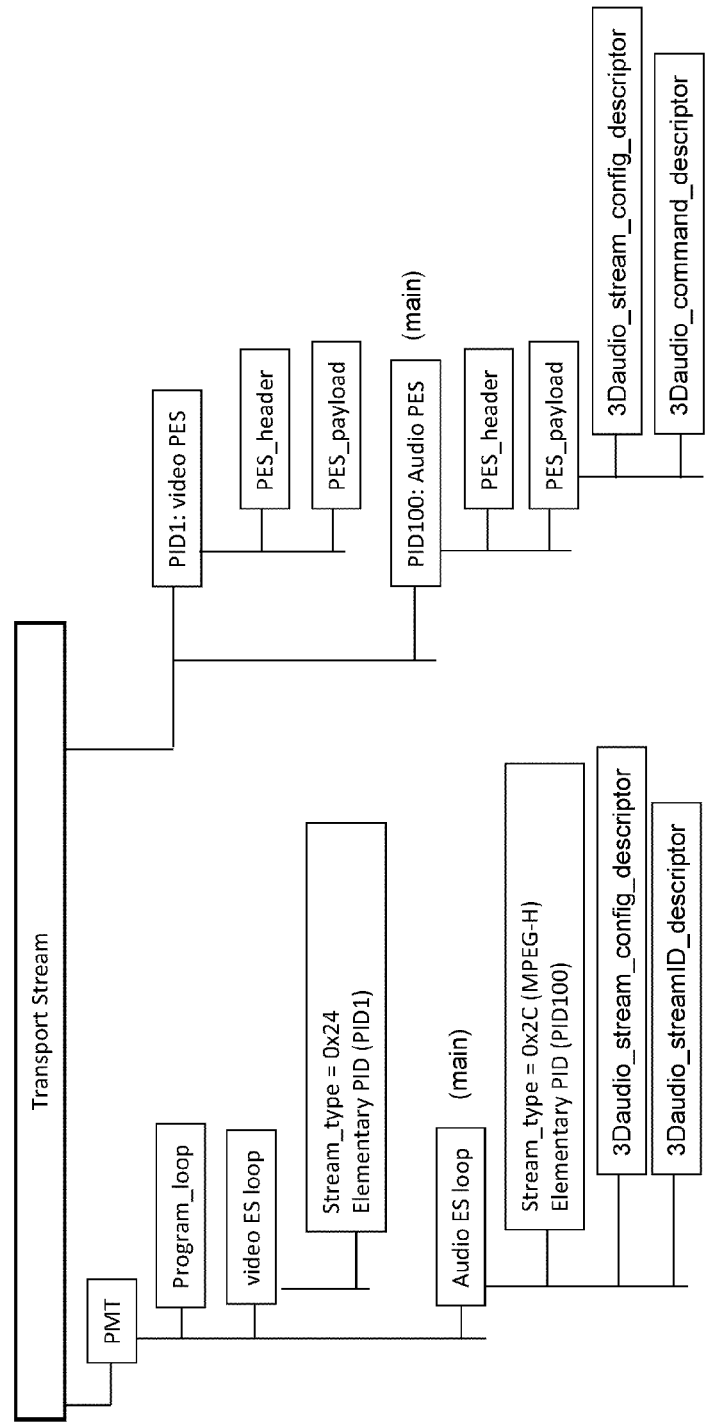
FIG. 19 is a diagram illustrating a configuration example of the transport stream TS in a case where the transmission data for 3D audio is transmitted in one stream.

FIG. 19 illustrates a configuration example of the transport stream TS in a case where the transmission data for 3D audio is transmitted in one stream of the main stream (refer to FIGS. 3 and 5(*a*)). According to this configuration example, there is a PES packet "video PES" of a video stream identified by PID1. In addition, in this configuration example, there is a PES packet "audio PES" of one audio stream identified by PID100. The PES packet is made up of a PES header (PES header) and a PES payload (PES payload).

The channel coded data (CD) distinguished as group 1, the immersive audio object coded data (IA0) distinguished as group 2, the speech dialog object coded data (SDO) distinguished as groups 3 and 6, the sound object coded data (SUO) distinguished as groups 4 and 5, and the audio description object coded data (ADO) distinguished as groups 7 and 8 are included within the PES payload of the PES packet of the audio stream identified by PID100 (main stream). The descriptor information "Desc" (refer to FIG.

5(*a*)) on the 3D audio stream configuration descriptor and 3D audio command descriptor is inserted into this PES payload.

In addition, the PMT has an elementary stream loop having information relating to each of the elementary streams. In this configuration example, there is a video elementary stream loop (video ES loop) corresponding to the video stream and additionally, there is an audio elementary stream loop (audio ES loop) corresponding to the one audio stream.

Information such as a stream type and a packet identifier (PID) is arranged in the video elementary stream loop (video ES loop) so as to correspond to the video stream and at the same time, a descriptor stating information relating to this video stream is also arranged therein. The value of "Stream type" for this video stream is set to "0x24", whereas PID information is configured so as to indicate PID1 given to the PES packet "video PES" of the video stream as described above.

Information such as a stream type and a packet identifier (PID) is arranged in the audio elementary stream loop (audio ES loop) so as to correspond to the audio stream (main stream) and at the same time, a descriptor stating information relating to this audio stream is also arranged therein. The value of "Stream type" for this audio stream is set to "0x2C", whereas PID information is configured so as to indicate PID100 given to the PES packet "audio PES" of the main stream as described above. The 3D audio stream configuration descriptor and the 3D audio stream ID descriptor are arranged in this audio elementary stream loop (audio ES loop).

[Configuration Example of Service Receiver]

Figure 20:
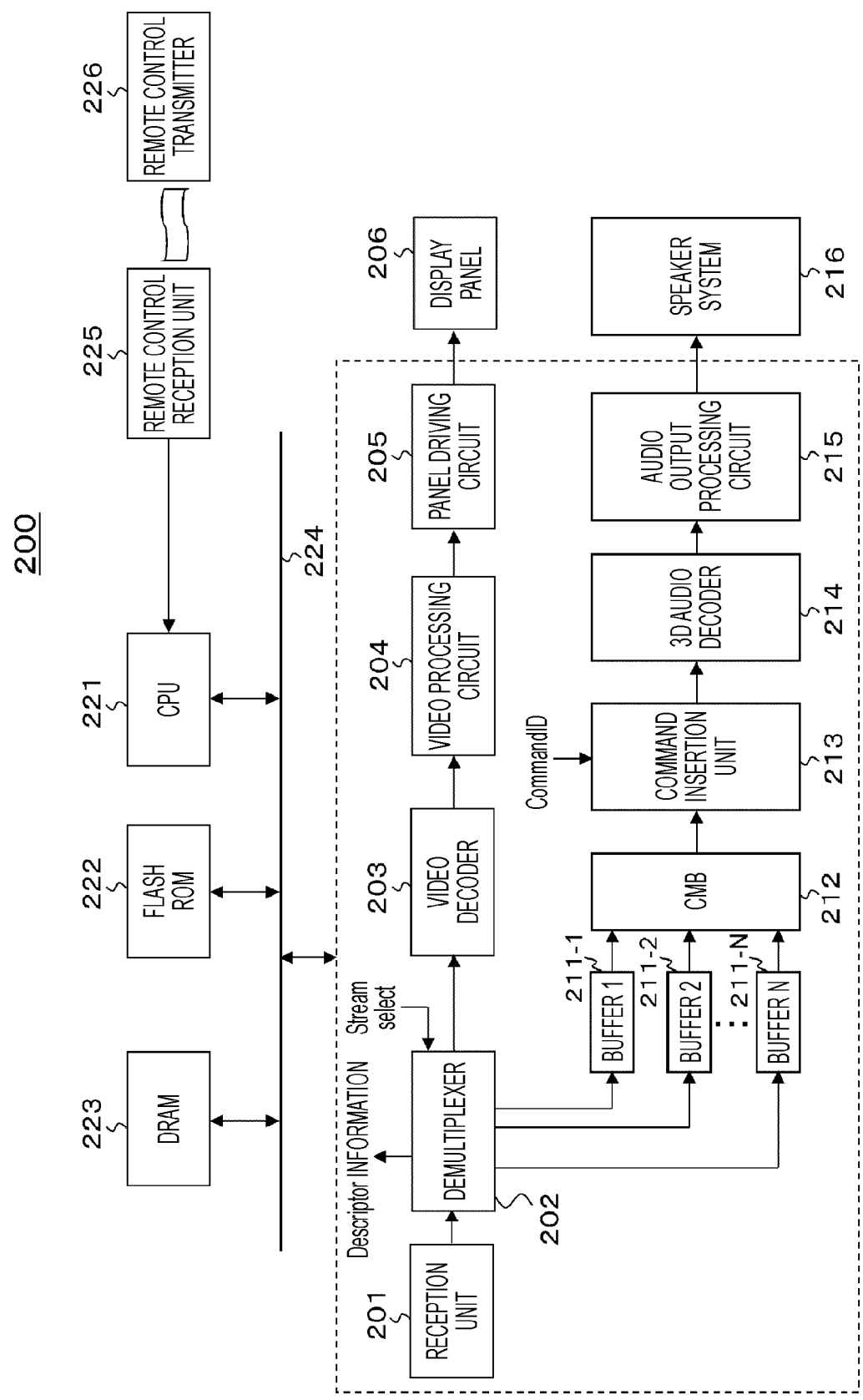
FIG. 20 is a block diagram illustrating a configuration example of a service receiver.

FIG. 20 illustrates a configuration example of the service receiver 200. This service receiver 200 has a reception unit 201, a demultiplexer 202, a video decoder 203, a video processing circuit 204, a panel driving circuit 205, and a display panel 206. This service receiver 200 also has multiplexing buffers 211-1 to 211-N, a combiner 212, a command insertion unit 213, a 3D audio decoder 214, an audio output processing circuit 215, and a speaker system 216. In addition, this service receiver 200 has a CPU 221, a flash ROM 222, a DRAM 223, an internal bus 224, a remote control reception unit 225, and a remote control transmitter 226.

The CPU 221 controls the action of each member of the service receiver 200. The flash ROM 222 stores control software and holds data. The DRAM 223 constitutes a work area of the CPU 221. The CPU 221 develops software and data read from the flash ROM 222 on the DRAM 223 to activate the software and controls each member of the service receiver 200.

The remote control reception unit 225 receives a remote control signal (remote control code) transmitted from the remote control transmitter 226 to supply to the CPU 221. The CPU 221 controls each member of the service receiver 200 on the basis of this remote control code. The CPU 221, the flash ROM 222, and the DRAM 223 are connected to the internal bus 224.

The reception unit 201 receives the transport stream TS sent from the service transmitter 100 by being incorporated into the broadcasting wave or a packet in a network. This transport stream TS has, in addition to the video stream, the predetermined number of audio streams including the coded data of the plurality of groups constituting the transmission data for 3D audio.

Figure 21:
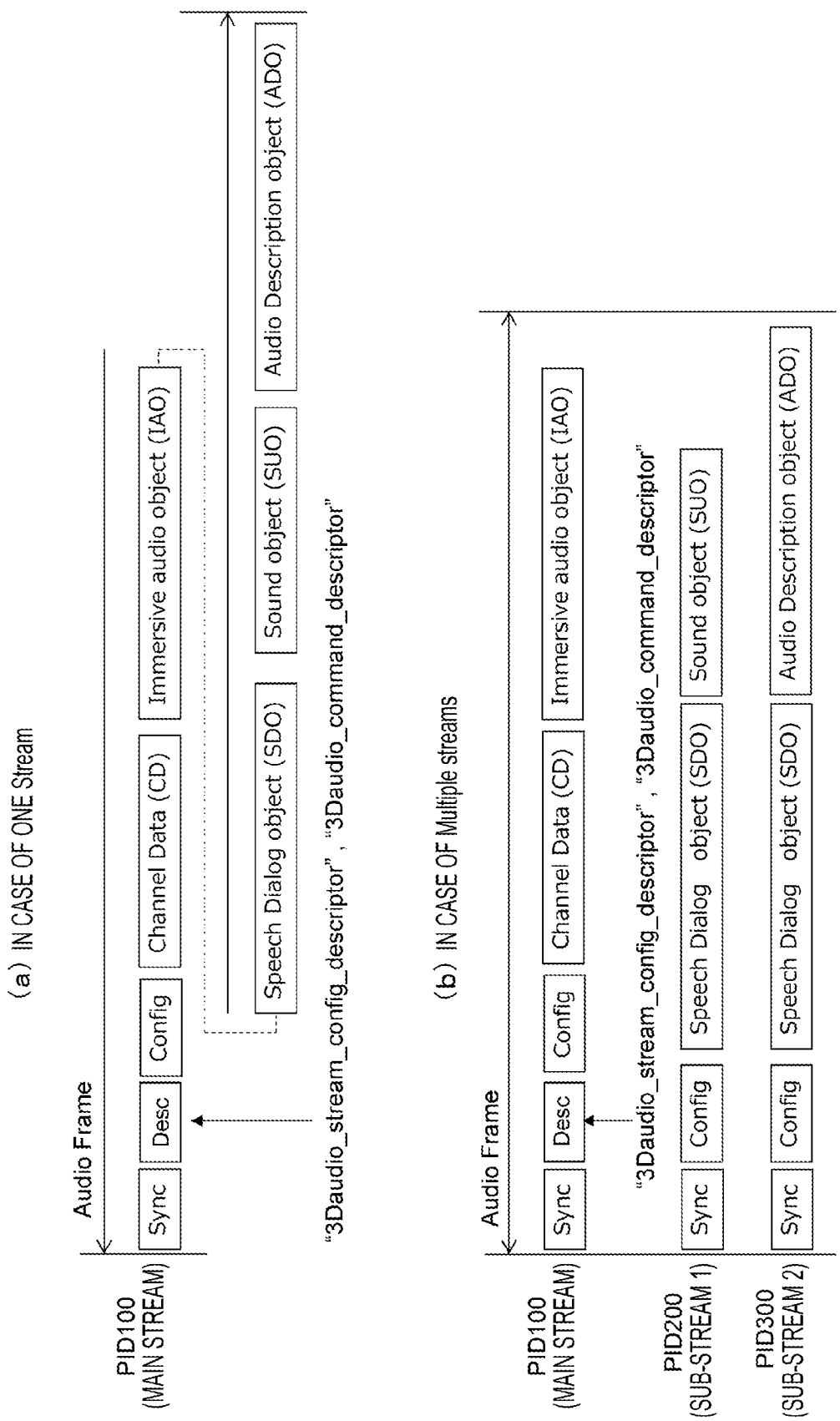
FIG. 21 is a diagram illustrating an example of a received audio stream.

FIG. 21 illustrates an example of an audio stream to be received. FIG. 21(*a*) illustrates an example of one stream (main stream). This main stream is identified by the identifier PID100. The channel coded data (CD), the immersive audio object coded data (IAO), the speech dialog object coded data (SDO), the sound object coded data (SUO), and the audio description object coded data (ADO) are included in this main stream together with "SYNC" and "Config" (refer to FIG. 3).

In addition, the 3D audio stream configuration descriptor including the transmission data configuration information and the command information (refer to FIGS. 13 and 14) and the 3D audio command descriptor including the command information (refer to FIG. 17(*a*)) are inserted between "SYNC" and "Config" as the descriptor information ("Desc").

FIG. 21(*b*) illustrates an example of multiple streams, here, three streams. The channel coded data (CD) and the immersive audio object coded data (IAO) are included in the main stream identified by PID100 together with "SYNC" and "Config" (refer to FIG. 3).

Meanwhile, the speech dialog object coded data (SDO) and the sound object coded data (SUO) are included in sub-stream 1 identified by PID200 together with "SYNC" and "Config" (refer to FIG. 3). In addition, the speech dialog object coded data (SDO) and the audio description object coded data (ADO) are included in sub-stream 2 identified by PID300 together with "SYNC" and "Config" (refer to FIG. 3).

The 3D audio stream configuration descriptor including the transmission data configuration information and the command information (refer to FIGS. 13 and 14) and the 3D audio command descriptor including the command information (refer to FIG. 17(*a*)) are inserted in the main stream between "SYNC" and "Config" as the descriptor information ("Desc").

The demultiplexer 202 extracts a packet of the video stream from the transport stream TS to send to the video decoder 203. The video decoder 203 reconstructs the video stream from the packet for video extracted by the demultiplexer 202 and performs decoding processing to obtain uncompressed video data.

The video processing circuit 204 performs scaling processing, image quality adjustment processing, and the like on the video data obtained by the video decoder 203 to obtain video data for display. The panel driving circuit 205 drives the display panel 206 on the basis of image data for display obtained by the video processing circuit 204. The display panel 206 is constituted by, for example, a liquid crystal display (LCD) or an organic electroluminescence display (organic EL display).

Additionally, the demultiplexer 202 extracts various items of information such as the descriptor information from the transport stream TS to send to the CPU 221. These various items of information include information in the above-described 3D audio stream configuration descriptor and 3D audio stream ID descriptor as well (refer to FIGS. 18 and 19).

From the information in the 3D audio stream configuration descriptor, the CPU 221 recognizes the correspondence relationships of the commands with the groups and the preset groups (refer to FIGS. 7 and 10) together with the transmission data configuration (refer to FIGS. 3 and 8). The CPU 221 also recognizes in which audio stream each group is included, from the information in the 3D audio stream ID descriptor.

The CPU 221 determines a group to be decoded on the basis of the transmission data configuration information and a user selection operation as well as the processing function of a system and creates a command (command identifier: CommandID) for specifying the group. In this case, the CPU 221 displays a user interface (UI) screen for the user to perform a selection operation, on the basis of the transmission data configuration information (refer to FIG. 11). The user performs a selection operation on this UI screen.

In addition, under the control of the CPU 221, the demultiplexer 202 selectively fetches all audio streams including a group determined to be decoded, from the predetermined number of audio streams included in the transport stream TS using a PID filter. Note that, in a case where the predetermined number of audio streams includes one stream (refer to FIG. 21(*a*)), this audio stream is always fetched. Meanwhile, in a case where the predetermined number of audio streams includes multiple streams (refer to FIG. 21(*b*)), the main stream including the channel coded data (CD) is always fetched.

Each of the multiplexing buffers 211-1 to 211-N fetches thereinto each audio stream fetched by the demultiplexer 202. Here, a necessary and sufficient number is employed as the number N of the multiplexing buffers 211-1 to 211-N, but in an actual action, the multiplexing buffers are used as many as the number of audio streams fetched by the demultiplexer 202.

The combiner 212 reads the audio stream in units of audio frames from the multiplexing buffer into which each audio stream fetched by the demultiplexer 202 has been separately fetched, among the multiplexing buffers 211-1 to 211-N, to integrate, thereby obtaining one audio stream. In this case, when one audio stream is fetched by the demultiplexer 202, this audio stream is used as the one audio stream as it is.

Similarly to the one stream (main stream) (refer to FIG. 21(*a*)) or the main stream in the multiple streams (refer to FIG. 21(*b*)), the 3D audio stream configuration descriptor including the transmission data configuration information and the command information and the 3D audio command descriptor constituting the command insertion area have been inserted into this one audio stream between "SYNC" and "Config" as the descriptor information ("Desc").

The command insertion unit 213 inserts a command for specifying a group determined to be decoded, which has been created by the CPU 221, into the command insertion area of the one audio stream obtained by the combiner 212, that is, describes the command in the 3D audio command descriptor.

The CPU 221 creates a command included in the command information, or independently creates an individual command together with a command included in the command information, or independently creates only an individual command as a command for specifying a group determined to be decoded.

For example, a case where the CPU 221 determines groups 1, 2, 3, and 4 as groups to be decoded is considered in the configuration example of the transmission data for 3D audio illustrated in FIG. 3. First, an example of selection processing for a decoding target in a case where the received audio stream has one stream (refer to FIG. 21(*a*)) will be described.

In this case, as illustrated in FIG. 22(*a*), the main stream which is the received audio stream is supplied as it is to the command insertion unit 213. In this main stream, all the coded data of groups 1 to 8 are included. In this case, for example, as illustrated in FIG. 22(*b*), the CPU 221 creates only one command of "13" designating groups 1, 2, 3, and 4 as decoding targets (refer to FIG. 7) as a command (command identifier: CommandID).

Alternatively, as illustrated in FIG. 22(*b*), for example, the CPU 221 creates "19" designating preset group 1 as a decoding target (refer to FIG. 7), an individual command "A" designating group 3 as a decoding target in switch group 1, and an individual command "B" designating group 4 as a decoding target in switch group 2 as commands (command identifiers: CommandIDs).

Then, as illustrated in FIG. 22(*c*), the command insertion unit 213 inserts the command (command identifier: CommandID) created by the CPU 221 into the command insertion area of the one audio stream to be supplied to the 3D audio decoder 214. As a result, the 3D audio decoder 214 is notified that, among groups 1 to 8 included in the one audio stream, groups 1, 2, 3, and 4 are the groups assigned as decoding targets.

Figure 23:
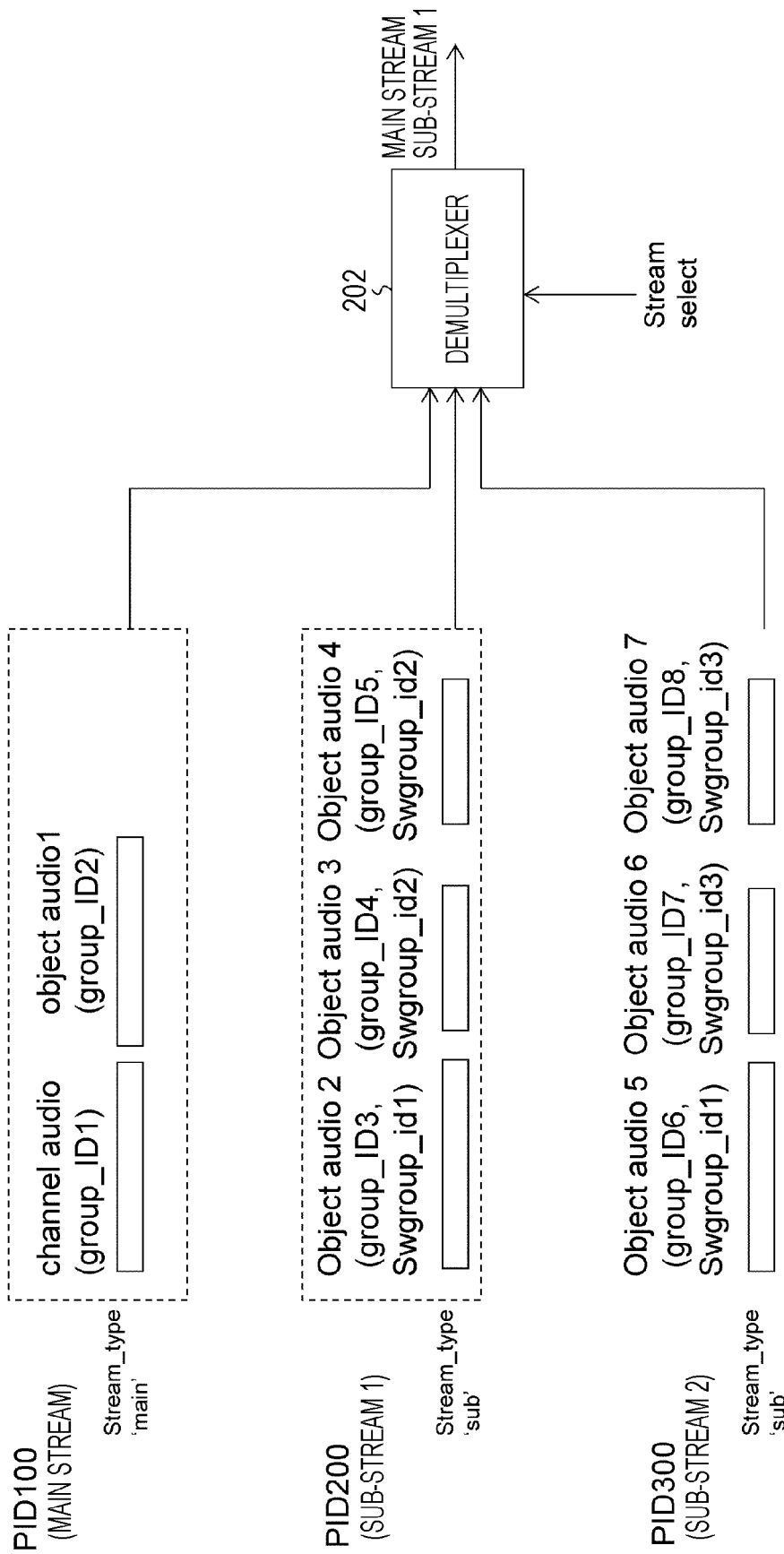
FIG. 23 is a diagram for explaining an example of selection processing for a decoding target in a case where the received audio stream has three streams (1/2).

Next, an example of selection processing for a decoding target in a case where the received audio stream has multiple streams, here, three streams (refer to FIG. 21(*b*)) will be described. FIG. 23 illustrates stream fetch processing in the demultiplexer 202. The demultiplexer 202 fetches a stream designated by a stream selection signal "Stream select" from the CPU 221 as a fetch target.

In this case, since the main stream includes groups 1 and 2, the main stream is designated as a fetch target by the CPU 221 and this main stream is fetched by the demultiplexer 202. In addition, since sub-stream 1 includes groups 3 and 4, sub-stream 1 is designated as a fetch target by the CPU 221 and this sub-stream 1 is also fetched by the demultiplexer 202.

Figure 24:
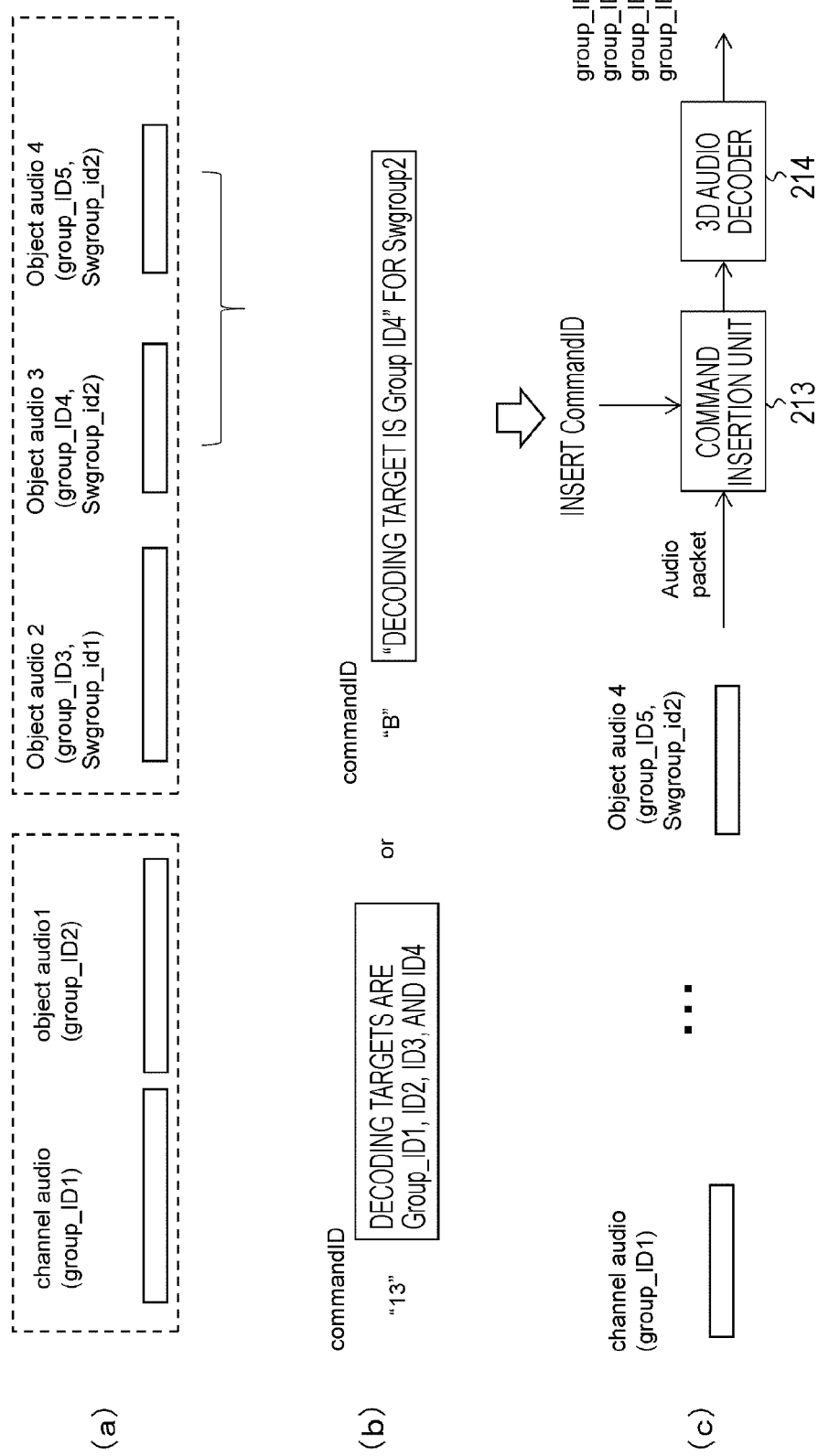
FIG. 24 is a diagram for explaining an example of selection processing for a decoding target in a case where the received audio stream has three streams (2/2).

As illustrated in FIG. 24(*a*), one audio stream obtained by integrating the main stream and sub-stream 1 fetched by the demultiplexer 202 is supplied to the command insertion unit 213. In this case, for example, as illustrated in FIG. 24(*b*), the CPU 221 creates only one command of "13" designating groups 1, 2, 3, and 4 as decoding targets (refer to FIG. 7) as a command (command identifier: CommandID). Alternatively, as illustrated in FIG. 24(*b*), for example, the CPU 221 creates an individual command "B" designating group 4 as a decoding target in switch group 2.

Then, as illustrated in FIG. 24(*c*), the command insertion unit 213 inserts the command (command identifier: CommandID) created by the CPU 221 into the command insertion area of the one audio stream to be supplied to the 3D audio decoder 214. As a result, the 3D audio decoder 214 is notified that, among groups 1 to 5 included in the one audio stream, groups 1, 2, 3, and 4 are the groups assigned as decoding targets.

Returning to FIG. 20, the 3D audio decoder 214 applies decoding processing to coded data of a group designated by the inserted command as a decoding target from among coded data of the plurality of groups included in the one audio stream supplied thereto via the command insertion unit 213, thereby obtaining audio data for driving each speaker.

In this case, when decoding the channel coded data, the 3D audio decoder 214 performs processing of downmixing or upmixing to a speaker configuration of the speaker system 216 to obtain the audio data for driving each speaker. Meanwhile, when decoding the object coded data, the 3D audio decoder 214 calculates speaker rendering (a mixing ratio to each speaker) on the basis of object information (metadata) and, in accordance with a result of the calculation, mixes audio data of the object to the audio data for driving each speaker.

The audio output processing circuit 215 performs necessary processing such as D/A conversion and amplification on the audio data for driving each speaker obtained by the 3D audio decoder 214 and supplies the audio data to the speaker system 216. The speaker system 216 includes a plurality of speakers for multiple channels, for example, 2 channels, 5.1 channels, 7.1 channels, and 22.2 channels.

Figure 25:
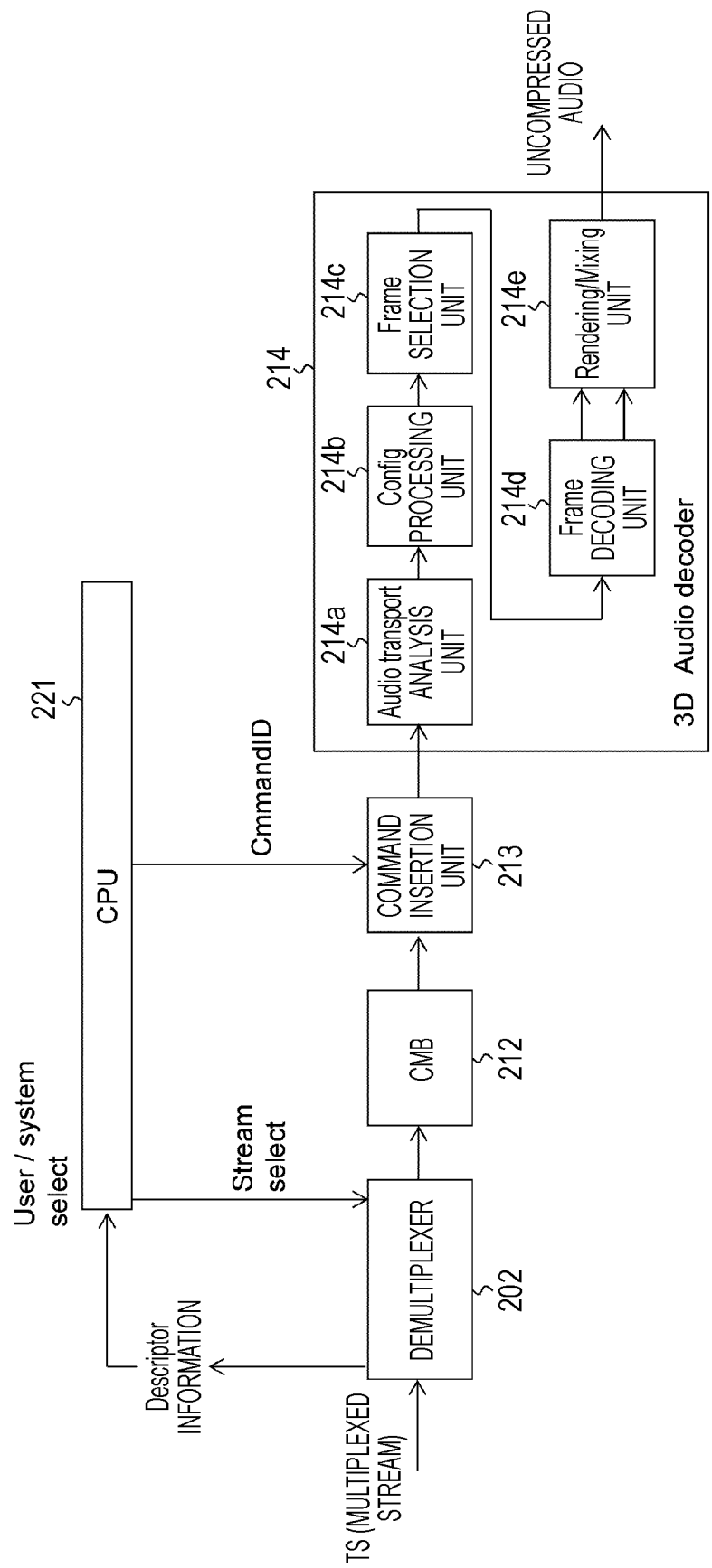
FIG. 25 is a block diagram illustrating a configuration example of a 3D audio decoder.

FIG. 25 illustrates a configuration example of the 3D audio decoder 214. The 3D audio decoder 214 has an audio transport analysis unit 214a, a configuration (Config) processing unit 214b, a frame selection unit 214c, a frame decoding unit 214d, and a rendering/mixing unit 214e.

The audio transport analysis unit 214a performs packet analysis of the audio stream to retrieve a packet of the descriptor and further performs command analysis to obtain information on a group assigned as a decoding target. The configuration processing unit 214b consults information in audio scene information (AudioSceneInfo) supplied in a configuration (Config) packet, that is, the group ID (GroupID), the switch group ID (SwitchGroupID), the preset group ID (PresetGroupID), and the like to select a frame to be decoded and notifies the frame decoding unit 214d thereof.

The frame decoding unit 214d performs decoding processing on the coded data of the frame assigned as a decoding target. The rendering/mixing unit 214e performs processing such as rendering and mixing using decoding output obtained by the frame decoding unit 214d to obtain audio data (uncompressed audio) for driving each speaker.

The action of the service receiver 200 illustrated in FIG. 20 will be briefly described. In the reception unit 201, the transport stream TS sent from the service transmitter 100 by being incorporated into the broadcasting wave or a packet in a network is received. This transport stream TS has, in addition to the video stream, the predetermined number of audio streams including the coded data of the plurality of groups constituting the transmission data for 3D audio. This transport stream TS is supplied to the demultiplexer 202.

In the demultiplexer 202, a packet of the video stream is extracted from the transport stream TS to be supplied to the video decoder 203. In the video decoder 203, the video stream is reconstructed from the packet for video extracted by the demultiplexer 202 and decoding processing is performed thereon to obtain uncompressed video data. This video data is supplied to the video processing circuit 204.

In the video processing circuit 204, scaling processing, image quality adjustment processing, and the like are performed on the video data obtained by the video decoder 203 to obtain video data for display. This video data for display is supplied to the panel driving circuit 205. In the panel driving circuit 205, the display panel 206 is driven on the basis of the video data for display. As a result, an image corresponding to the video data for display is displayed on the display panel 206.

Additionally, in the demultiplexer 202, various items of information such as the descriptor information are extracted from the transport stream TS and sent to the CPU 221. These various items of information include information in the 3D audio stream configuration descriptor including the data configuration information and the command information and the 3D audio stream ID descriptor including the stream identifier information as well (refer to FIGS. 18 and 19).

In the CPU 221, the correspondence relationships of the commands with the groups and the preset groups (refer to FIGS. 7 and 10) are recognized together with the transmission data configuration (refer to FIGS. 3 and 8) from the information in the 3D audio stream configuration descriptor. In addition, the CPU 221 recognizes in which audio stream each group is included, from the information in the 3D audio stream ID descriptor.

In the CPU 221, a group to be decoded is determined on the basis of the transmission data configuration information and a user selection operation as well as the processing function of a system, and the like and a command (command identifier: CommandID) for specifying the group is created. In this case, for example, a user interface (UI) screen for the user to perform a selection operation is displayed on the display panel 206 through the control of the CPU 221 (refer to FIG. 11).

In addition, in the demultiplexer 202, all audio streams including a group determined to be decoded are selectively fetched from the predetermined number of audio streams included in the transport stream TS under the control of the CPU 221 using a PID filter. In this case, the stream selection signal "Stream select" is supplied from the CPU 221 to the demultiplexer 202 and a stream assigned as a fetch target is designated.

The audio stream fetched by the demultiplexer 202 is fetched into a corresponding multiplexing buffer among the multiplexing buffers 211-1 to 211-N. In the combiner 212, the audio stream is read in units of audio frames from each of the multiplexing buffers into which the audio stream has been fetched and then integrated into one audio stream. This one audio stream is supplied to the command insertion unit 213.

In the command insertion unit 213, a command for specifying a group determined to be decoded, which has been created by the CPU 221, is inserted into the command insertion area of the one audio stream obtained by the combiner 212. In this case, a command (command identifier: CommandID) is described in the 3D audio command descriptor inserted into the one audio stream obtained by the combiner 212.

The one audio stream into which the command has been inserted is supplied to the 3D audio decoder 214. In this 3D audio decoder 214, decoding processing is applied to coded data of a group designated by the inserted command as a decoding target from among coded data of the plurality of groups included in this one audio stream and audio data for driving each speaker is obtained.

This audio data for driving each speaker is supplied to the audio processing circuit 215. In the audio output processing circuit 215, necessary processing such as D/A conversion and amplification is performed on this audio data. Then, the audio data obtained after the processing is supplied to the speaker system 216. As a result, acoustic output corresponding to a display image on the display panel 206 is obtained from the speaker system 216.

As described above, in the transmission/reception system 10 illustrated in FIG. 1, the service transmitter 100 inserts, into the container (transport stream TS), the command information for creating a command specifying a group to be decoded from among the plurality of groups. Therefore, referring to this command information makes it easy for the receiving side to perform creation processing for the command specifying a group to be decoded.

In addition, in the transmission/reception system 10 illustrated in FIG. 1, the service transmitter 100 provides the command insertion area for the receiving side to insert the command for specifying a group to be decoded, in at least one audio stream among the predetermined number of audio streams. Therefore, in a case where a command is inserted into the audio stream at the receiving side, this command insertion area can be used and the command insertion processing becomes easy.

Furthermore, in the transmission/reception system 10 illustrated in FIG. 1, the service receiver 200 inserts a command for specifying a group to be decoded into the audio stream to send to the 3D audio decoder 214. Therefore, in the 3D audio decoder 214, it is made possible to selectively decode only coded image data of the group to be decoded.

In this case, the combiner 212 is not required to perform group selection processing, enabling efficient processing. In other words, processing of entering the inside of an audio frame (Audio Frame) and finding group information and a boundary between the groups can be more efficiently performed in a case where the processing is left to the 3D audio decoder 214.

2. Variations

Note that the above-described embodiments have indicated an example in which the 3D audio stream configuration descriptor including the transmission data configuration information and the command information is inserted into an audio stream in addition to the container (transport stream TS) to be transmitted but it is also conceivable to insert the 3D audio stream configuration descriptor into only one of them to transmit.

In addition, the above-described embodiments have indicated an example of transmission by inserting the command insertion area into the audio stream. However, the present technology is not limited to this, but it is also conceivable to provide the command insertion area at the receiving side to insert a command.

Furthermore, the above-described embodiments have indicated an example in which both of the channel coded data and the object coded data are included in the coded data of the plurality of groups (refer to FIGS. 3 and 8). However, the present technology can be similarly applied to a case where only the channel coded data or only the object coded data is included in the coded data of the plurality of groups.

Additionally, the above-described embodiments have indicated an example in which the transport stream (MPEG-2 TS) serves as the container. However, the present technology can be similarly applied to a system in which distribution is performed by MP4 or a container of a format other than MP4. Examples thereof include a stream distribution system based on MPEG-DASH, or a transmission/reception system handling a transmission stream having an MPEG media transport (MMT) structure.

Note that the present technology can be also configured as described below.

(1) A transmission device including:
an audio encoding unit configured to generate a predetermined number of audio streams including coded data of a plurality of groups;
a transmission unit configured to transmit a container of a predetermined format having the predetermined number of audio streams; and
an information insertion unit configured to insert, into the container and/or some of the audio streams, command information for creating a command specifying a group to be decoded from among the plurality of groups.

(2) The transmission device according to (1) above, in which
the command information is information indicating correspondence relationships of the command with the groups, or information indicating a correspondence relationship of the command with a preset group made up of a combination of the predetermined number of groups.

(3) The transmission device according to (1) or (2) above, in which
the predetermined number of audio streams is made up of a main stream and a predetermined number of substreams, or only of the main stream, and
the information insertion unit inserts the command information into the main stream and/or a container position corresponding to the main stream.

(4) The transmission device according to any one of (1) to (3) above, in which
the audio encoding unit provides a command insertion area for a receiving side to insert a command specifying a group to be decoded, in at least one audio stream among the plurality of audio streams.

(5) A transmission method including:
an audio encoding step of generating a predetermined number of audio streams including coded data of a plurality of groups;
a transmission step of transmitting a container of a predetermined format having the predetermined number of audio streams using a transmission unit; and
an information insertion step of inserting, into the container and/or some of the audio streams, command information for creating a command specifying a group to be decoded from among the plurality of groups.

(6) A transmission device including:
an audio encoding unit configured to generate a predetermined number of audio streams including coded data of a plurality of groups; and
a transmission unit configured to transmit a container of a predetermined format having the predetermined number of audio streams, in which
the audio encoding unit provides a command insertion area for a receiving side to insert a command for specifying a group to be decoded, in at least one audio stream among the predetermined number of audio streams.

(7) The transmission device according to 6 above, in which
the predetermined number of audio streams is made up of a main stream and a predetermined number of substreams, or only of the main stream, and
the audio encoding unit provides the command insertion area in the main stream.

(8) A transmission method including:
an audio encoding step of generating a predetermined number of audio streams including coded data of a plurality of groups; and
a transmission step of transmitting a container of a predetermined format having the predetermined number of audio streams using a transmission unit, in which
in the audio encoding step, a command insertion area for a receiving side to insert a command for specifying a group to be decoded is provided in at least one audio stream among the predetermined number of audio streams.

(9) A reception device including:
a reception unit configured to receive a container of a predetermined format having a predetermined number of audio streams including coded data of a plurality of groups;
a stream acquisition unit configured to fetch all audio streams including a group to be decoded from the predetermined number of audio streams and obtain one audio stream constructed by integrating all of the fetched audio streams;

a command creation unit configured to create a command for specifying the group to be decoded from among a predetermined number of groups included in the one audio stream;
a command insertion unit configured to insert the command created by the command creation unit into the one audio stream acquired by the stream acquisition unit; and
an audio decoding unit configured to accept input of the one audio stream into which the command has been inserted and apply decoding processing to coded data of the group specified by the command from among the predetermined number of groups included in the one audio stream.
(10) The reception device according to (9) above, in which
the command creation unit creates a command according to a selection operation of a user on a user interface screen.
(11) The reception device according to (9) or (10) above, in which
command information for creating a command specifying a group to be decoded from among the plurality of groups is inserted into some of the audio streams and/or the container received by the reception unit, and
the command creation unit creates the command with reference to the command information.
(12) The reception device according to any one of (9) to (11) above, in which
a command insertion area for inserting a command for specifying a group to be decoded is provided in at least one audio stream among the predetermined number of audio streams received by the reception unit,
the one audio stream acquired by the stream acquisition unit has the command insertion area, and
the command insertion unit inserts the command into the command insertion area of the one audio stream.
(13) A reception method including:
a reception step of receiving a container of a predetermined format having a predetermined number of audio streams including coded data of a plurality of groups using a reception unit;
a stream acquisition step of fetching all audio streams including a group to be decoded from the predetermined number of audio streams and obtaining one audio stream constructed by integrating all of the fetched audio streams;
a command creation step of creating a command for specifying the group to be decoded from among a predetermined number of groups included in the one audio stream;
a command insertion unit configured to insert the command created at the command creation step into the one audio stream acquired at the stream acquisition step; and
an audio decoding step of accepting input of the one audio stream into which the command has been inserted and applying decoding processing to coded data of the group specified by the command from among the predetermined number of groups included in the one audio stream.

A main feature of the present technology is that the command information for creating a command specifying a group to be decoded from among the plurality of groups is inserted into the container and/or the audio stream, whereby creation processing for the command specifying a group to be decoded becomes easy at the receiving side (refer to FIGS. 18 and 19). In addition, a main feature of the present technology is that the command insertion area for the receiving side to insert a command for specifying a group to be decoded is provided in at least one audio stream among the predetermined number of audio streams, whereby command insertion processing becomes easy at the receiving side (refer to FIG. 5). Furthermore, a main feature of the present technology is that a configuration of inserting a command for specifying a group to be decoded into the audio stream to send to the 3D audio decoder is employed, whereby the efficiency of group selection processing is improved at the receiving side (refer to FIGS. 20 and 25).

REFERENCE SIGNS LIST

10 Transmission/reception system
100 Service transmitter
110 Stream generation unit
112 Video encoder
113 Audio encoder
114 Multiplexer
200 Service receiver
201 Reception unit
202 Demultiplexer
203 Video decoder
204 Video processing circuit
205 Panel driving circuit
206 Display panel
211-1 to 211-N Multiplexing buffer
212 Combiner
213 Command insertion unit
214 3D audio decoder
214a Audio transport analysis unit
214b Configuration processing unit
214c Frame selection unit
214d Frame decoding unit
214e Rendering/mixing unit
215 Audio output processing circuit
216 Speaker system
221 CPU
222 Flash ROM
223 DRAM
224 Internal bus
225 Remote control reception unit
226 Remote control transmitter

The invention claimed is:
1. A transmission device, comprising:
processing circuitry configured to:
generate a predetermined number of audio streams including encoded data of a plurality of groups;
transmit a container of a predetermined format having the predetermined number of audio streams, and
insert, into the container and/or at least one of the audio streams, command information, wherein the command information includes information indicating a correspondence between a plurality of commands and a plurality of groups, or information indicating a correspondence between preset groups composed of combinations of commands and a predetermined number of groups, and wherein a receiver selects a particular command, out of the plurality of commands included in the command information, so that a decoder selectively decodes only particular encoded data of a particular subset of groups, based on the particular command selected by the receiver.

2. The transmission device according to claim 1, wherein the predetermined number of audio streams consists of a main stream and a predetermined number of substreams or only the main stream.

3. The transmission device according to claim 2, wherein the command information is inserted into the main stream and/or a container position corresponding to the main stream.

4. The transmission device according to claim 1, wherein at least one audio stream of the audio streams is provided with a command insertion area for inserting, by the receiver, the particular command specifying the particular subset of groups to be decoded by the decoder.

5. The transmission device according to claim 1, wherein the particular command represents the particular subset of groups from the plurality of groups that are assigned for decoding such that only the particular subset of groups are decoded with remaining groups of the plurality of groups remaining encoded.

6. A reception device, comprising:
    processing circuitry configured to:
        receive a container in a predetermined format having a predetermined number of audio streams containing multiple groups of encoded data,
        extract audio streams including groups to be decoded from the predetermined number of audio streams,
        obtain one audio stream that integrates all the extracted audio streams,
        generate a command for specifying a particular group to be decoded among a predetermined number of groups included in the one audio stream,
        insert, after receiving the container but before performing decoding processing, the generated command into the obtained one audio stream to generate a modified one audio stream,
    and
        perform the decoding processing on encoded data of the particular group specified by the generated command among a predetermined number of groups included in the modified one audio stream.

7. The reception device according to claim 6, wherein the command is generated according to a user's selection operation on a user interface screen,
    wherein command information for generating the command specifying the particular group to be decoded among the groups is inserted into the received one audio stream and/or the received container.

8. The reception device according to claim 7, wherein the processing circuitry is further configured to generate the command by referring to the command information.

9. The reception device according to claim 6, wherein the processing circuitry is further configured to insert the command for specifying the particular group to be decoded into at least one audio stream of the predetermined number of audio streams having a command insertion area.

10. The reception device according to claim 9, wherein the command is inserted into the command insertion area of the at least one audio stream.

11. A reception method, comprising:
    receiving, by receiver circuitry, a container of a predetermined format having a predetermined number of audio streams containing a plurality of groups of encoded data;
    extracting all audio streams including groups to be decoded from the predetermined number of audio streams and obtaining a single audio stream by integrating all the extracted audio streams,
    generating a command for specifying a particular group to be decoded among a predetermined number of groups included in the single audio stream:
    inserting, after receiving the container but before performing decoding, the command generated by the generating into one audio stream obtained by the obtaining to generate a modified one audio stream; and
    inputting the modified one audio stream in which the command is inserted to a decoder that decodes encoded data of the particular group specified by the command among a predetermined number of groups included in the modified one audio stream.

* * * * *